(12) United States Patent
Yang et al.

(10) Patent No.: US 12,242,015 B2
(45) Date of Patent: Mar. 4, 2025

(54) SPLIT INVERSION FOR NUCLEAR MAGNETIC RESONANCE DATA

(71) Applicant: Halliburton Energy Services, Inc., Houston, TX (US)

(72) Inventors: Jie Yang, Houston, TX (US); Rebecca Corina Jachmann, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 197 days.

(21) Appl. No.: 18/154,294

(22) Filed: Jan. 13, 2023

(65) Prior Publication Data

US 2024/0241283 A1 Jul. 18, 2024

(51) Int. Cl.
*G01V 3/32* (2006.01)
*G01N 24/08* (2006.01)

(52) U.S. Cl.
CPC ............. *G01V 3/32* (2013.01); *G01N 24/081* (2013.01)

(58) Field of Classification Search
CPC ................................ G01N 24/081; G01V 3/32
See application file for complete search history.

(56) References Cited

U.S. PATENT DOCUMENTS

| | | |
|---|---|---|
| 5,291,137 A | 3/1994 | Freedman |
| 6,518,756 B1 | 2/2003 | Morys et al. |
| 6,566,874 B1 | 5/2003 | Speier et al. |
| 7,196,516 B2 | 3/2007 | Blanz et al. |
| 7,268,547 B2 | 9/2007 | Kruspe et al. |
| 9,562,989 B2 | 5/2017 | Conrad et al. |
| 9,784,881 B2 | 10/2017 | Jachmann et al. |

(Continued)

FOREIGN PATENT DOCUMENTS

| | | |
|---|---|---|
| WO | 2006023346 A1 | 3/2006 |
| WO | 2012170014 A1 | 12/2012 |

(Continued)

OTHER PUBLICATIONS

"PCT Application No. PCT/US2019/055073, International Preliminary Report on Patentability", Apr. 21, 2022, 9 pages.

(Continued)

*Primary Examiner* — Gregory H Curran
(74) *Attorney, Agent, or Firm* — DeLizio, Peacock, Lewin & Guerra, LLP

(57) ABSTRACT

Some implementations transmit nuclear magnetic resonance (NMR) data between downhole tools and surface-based computers. A method may include generating a first vector in which each entry includes a spectrum coefficient associated with NMR echo signals. The method may include generating a cumulative sum vector in which each entry includes a sum including a spectrum coefficient of a corresponding entry in the first vector plus any spectrum coefficients of any entries that precede the first corresponding entry in the first vector. The method may include down sampling the cumulative sum vector to form a down-sampled vector including a subset of the cumulative sum vector. The method may include generating a compressed vector in which each entry includes a difference of a corresponding entry in the down sampled vector and any entry directly preceding the corresponding entry in the down sampled vector and transmitting the compressed vector over a communication channel.

20 Claims, 12 Drawing Sheets

(56) References Cited

U.S. PATENT DOCUMENTS

| | | | |
|---|---|---|---|
| 10,126,457 | B2 | 11/2018 | Coman et al. |
| 10,168,444 | B2 | 1/2019 | Jachmann et al. |
| 11,536,870 | B2 * | 12/2022 | Yang ................... G01V 3/32 |
| 2004/0032258 | A1 | 2/2004 | Blumich |
| 2006/0273787 | A1 | 12/2006 | Blanz |
| 2007/0096732 | A1 | 5/2007 | Samsonov et al. |
| 2008/0036457 | A1 | 2/2008 | Thern et al. |
| 2009/0192711 | A1 | 7/2009 | Tang |
| 2009/0292473 | A1 | 11/2009 | Kruspe et al. |
| 2010/0010744 | A1 | 1/2010 | Prange et al. |
| 2012/0025820 | A1 | 2/2012 | Cao Minh et al. |
| 2016/0018555 | A1 | 1/2016 | Jachmann et al. |
| 2016/0170066 | A1 | 6/2016 | Heaton |
| 2018/0003852 | A1 | 1/2018 | Jachmann et al. |
| 2018/0164465 | A1 | 6/2018 | Chen et al. |
| 2021/0103071 | A1 | 4/2021 | Jachmann et al. |

FOREIGN PATENT DOCUMENTS

| | | | |
|---|---|---|---|
| WO | 2021071470 | A1 | 4/2021 |
| WO | 2021071470 | A9 | 3/2022 |

OTHER PUBLICATIONS

PCT Application Serial No. PCT/US2019/055073, International Search Report, mailed Jul. 6, 2020, 4 pages.

PCT Application Serial No. PCT/US2019/055073, International Written Opinion, mailed Jul. 6, 2020, 7 pages.

U.S. Appl. No. 16/595,022; Non Final Office Action; Oct. 21, 2021, 11 pages.

U.S. Appl. No. 16/595,022; Non Final Office Action; May 13, 2021, 10 pages.

* cited by examiner

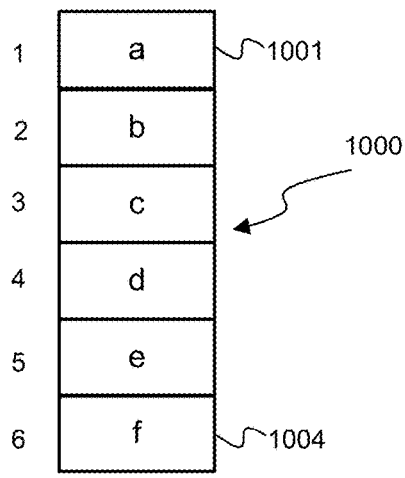
FIG. 10
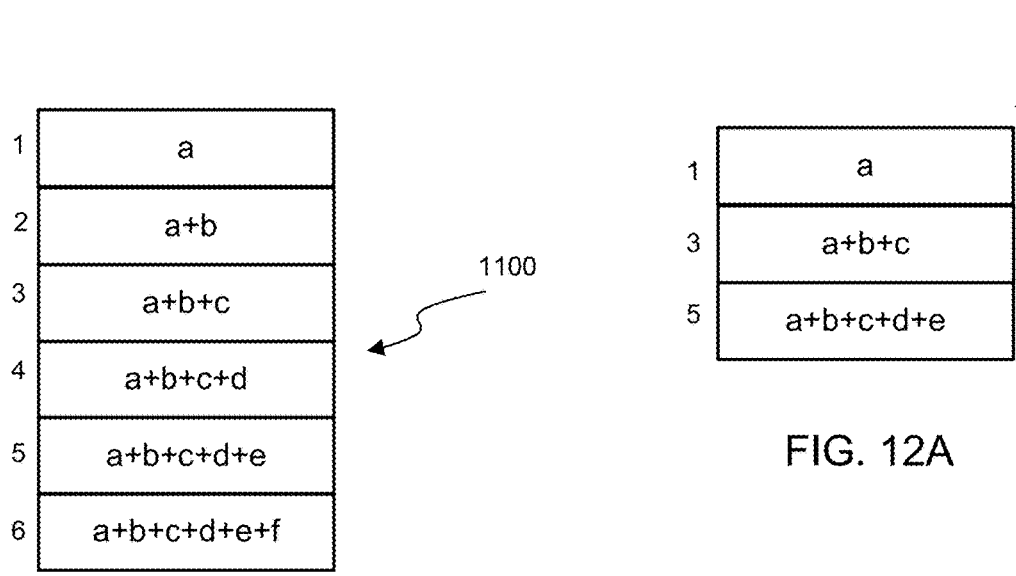
FIG. 11
FIG. 12A
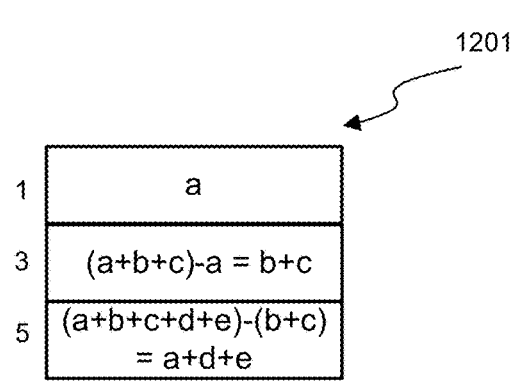
FIG. 12B

US 12,242,015 B2

SPLIT INVERSION FOR NUCLEAR MAGNETIC RESONANCE DATA

TECHNICAL FIELD

The disclosure generally relates to techniques for understanding subsurface formations, and in particular, techniques for using nuclear magnetic resonance (NMR) to evaluate subsurface formations.

BACKGROUND

Nuclear magnetic resonance (NMR) has two main experiments in oil field downhole usage. The first main experiment is to assess T1 buildup of magnetization. The main second experiment is to observe the decay of magnetization once it has been excited, in which the decay has a time constant of T2. NMR technology may provide vital information for well completions. The NMR data may provide a spectrum which can show the pore size distribution, oil water gas ratio, permeability, total porosity, and other insights into a well.

The NMR phenomenon arises from the nuclear spins. For downhole observation, an NMR measurement technique, designed by Carr, Purcell, Meiboom, and Gill and, hence, referred to as CPMG, may be used. The experimentation may consist of excitation, refocusing, and acquisition of a signal from the precession of the nuclear spins. The rawest form of the signal, an echo waveform, may be integrated into a single value known as an echo. The experiment may collect many echoes which make an echo train. Echo trains may be used to access the two fundamental time constants of the nuclear spins: T1 and T2. T1 is the time constant for the bulk nuclear spin, the magnetization, to align with the magnetic field. T2 is the decay time of the spins after they have been excited. For T1, the experiment is a combination of several CPMG trains which additionally have a "nullification" pulse and wait time preceding the excitation and refocusing pulses. This increments the time allowed for spin polarization, and thus can measure the T1. The T1 and T2 constants are independent of each other, aside from one limitation. The T2 can never be larger than T1 constant.

The echo trains, which measure T1, T2 or both may be analyzed to give meaningful results for making well completion decisions. The NMR data may inform decisions related to well operations and finished wells. Hence, it may be desirable to provide comparable results in real time while drilling to those that are provided after drilling. However, transmission speeds from the downhole bus/tool string to uphole computers may be too slow for transmission of raw echoes.

BRIEF DESCRIPTION OF THE DRAWINGS

Embodiments of the disclosure may be better understood by referencing the accompanying drawings.

FIG. 10 illustrates an example scalar vector.

FIG. 11 shows an example cumulative sum vector 1100 including spectral coefficient data.

FIG. 12A shows an example vector created by down sampling the cumulative sum vector.

FIG. 12B shows an example vector created by performing delta compression on the down sample vector.

DESCRIPTION OF SOME EMBODIMENTS

Overview of Some Inventive Aspects

NMR technology may provide insights used for completing a well. NMR data may provide a spectrum which can show a pore size distribution, an oil-water-gas ratio, a permeability, a total porosity, and other insights about the well. As noted, the NMR data may include echo trains that may be used to determine two fundamental time constants of the nuclear spins: T1 and T2. T1 may be a time constant related to the bulk nuclear spin, magnetization, and alignment with a magnetic field. T2 may be a decay time of the spins after they have been excited. T1 and T2 may be analyzed to give meaningful insights for making decisions about operations related to the well.

Transmission speed may be limited for communication channels that couple downhole tools to computing devices. Given the limited transmission speed, there may be practical limitations to amounts and types of NMR data that may be transmitted from downhole tools to computing devices at the surface. Some aspects of the inventive subject matter may perform a slit inversion process on NMR data that is captured downhole, where a first inversion may be performed downhole, and a second inversion may be performed by a computer system at the surface. In some implementations, an NMR logging tool may operate in a subsurface environment (e.g., a wellbore) to acquire NMR signal data indicating echoes. Based on the NMR signal data, the NMR logging tool may perform a first inversion of the NMR data to determine spectrum coefficients associated with the echoes. The NMR logging tool may perform operations to represent the spectrum coefficients in a relatively compact format for transmission to a computing device at the surface. For example, some implementations may represent spectrum coefficients in a cumulative sum vector in which each vector element is a sum of all previous elements. The spectrum coefficients may vary greatly. However, the difference between one element of the cumulative sum and the next may be relatively small, such as for the last few entries. Some implementations may compress the vector elements using any suitable compression by which the number of bits needed to transmit the cumulative sum may be less than the spectrum coefficients. Techniques for the split inversion process, forming the cumulative sum, and performing compression are described in greater detail below.

The surface-level computing system may receive and decompress the NMR data to attain the spectrum coefficients. The surface-level computer system may reconstruct the echoes using the spectrum coefficients. The surface-level computer system may use the new spectrum coefficients to glean insights and make decisions about the well.

NMR Data Processing

Figure 1:
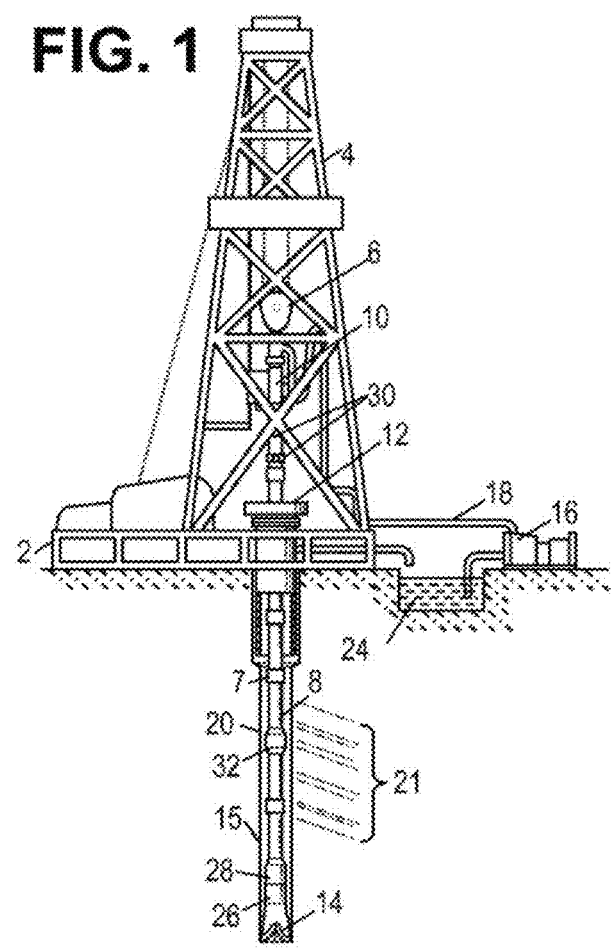
FIG. 1 shows an illustrative logging while drilling (LWD) environment.

FIG. 1 shows an illustrative logging while drilling (LWD) environment. A drilling platform 2 supports a derrick 4 having a traveling block 6 for raising and lowering a drill string 8. A top drive 10 supports and rotates the drill string 8 as the string is lowered through a well head 12. The drill string's rotation (and/or a downhole motor) drives a drill bit 14 to extend the borehole 15 through subsurface earth formations 21. As the drill string is extended into the borehole additional sections may be attached to the drill string using couplers, such as coupler to increase the overall length of the drill string. Mud recirculation equipment 16 draws drilling fluid from a retention pit 24 and pumps it through a feed pipe 18 to top drive 10, through the interior of drill string 8 to the drill bit 14, through orifices in the drill bit, through the annulus formed between a borehole wall 20 and around drill string 8 to a blowout preventer at the surface, and through a discharge pipe into the retention pit 24. The drilling fluid transports cuttings from the borehole into the retention pit 24 and aids in maintaining the borehole integrity.

An NMR logging tool 26 may be integrated into the bottom-hole assembly near the drill bit 14. The NMR logging tool 26 may take the form of a drill collar, i.e., a thick-walled tubular that provides weight and rigidity to aid the drilling process. As the bit extends the borehole through the formations, the NMR logging tool collects measurements relating to spin relaxation time (T1, T2, Tp, and/or T2*) distributions as a function of depth or position in the borehole. The NMR tool has a magnet, antenna, and supporting electronics. The permanent magnet in the tool causes the nuclear spins to build up into a cohesive magnetization. The T2 may be measured through the decay of excited magnetization while T1 may be measured by the buildup of magnetization. Other tools and sensors can also be included in the bottomhole assembly to gather measurements of various drilling parameters such as position, orientation, weight-on-bit, borehole diameter, etc. Control/telemetry module 28 collects data from the various bottom-hole assembly instruments (including position and orientation information) and stores them in internal memory, which may be able to store hundreds of hours of data. Selected portions of the data (raw or processed) can be communicated to surface receivers 30 by, e.g., mud pulse telemetry. Other logging—while drilling telemetry methods also exist and could be employed. For example, electromagnetic telemetry or through-wall acoustic telemetry can be employed with an optional repeater 32 to extend the telemetry range. Most telemetry systems also enable commands to be communicated from the surface to the control and telemetry module to configure the operation of the tools.

Figure 2:
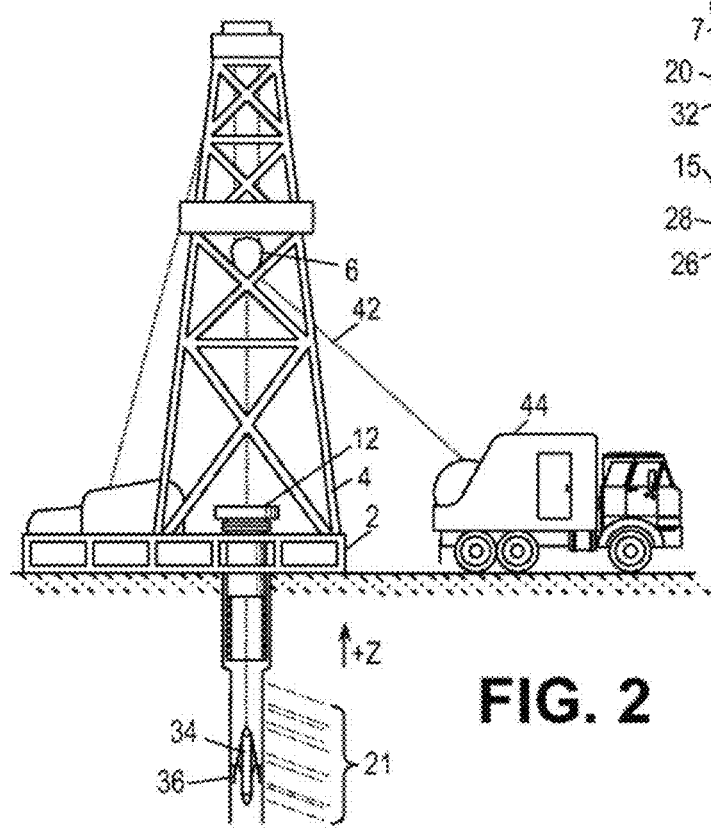
FIG. 2 shows an illustrative wireline logging environment.

FIG. 2 shows an illustrative wireline logging environment. At various times during the drilling process, the drill string 8 may be removed from the borehole as shown in FIG. 2. Once the drill string has been removed, logging operations can be conducted using a wireline logging tool 34, i.e., a sensing instrument sonde suspended by a cable 42 having conductors for transporting power to the tool and telemetry from the tool to the surface. The wireline logging tool 34 may have pads 36 and/or centralizing springs or a decentralizer to maintain the tool in the right position, for example, which could be near the axis of the borehole or against wall, as the tool may be pulled uphole. As explained further below; the wireline tool 34 can include an NMR logging instrument that collects relaxation time distribution measurements. A logging facility 44 collects measurements from the wireline logging tool 34 and includes a computer system for processing and storing the measurements gathered by the logging tool.

Figure 3:
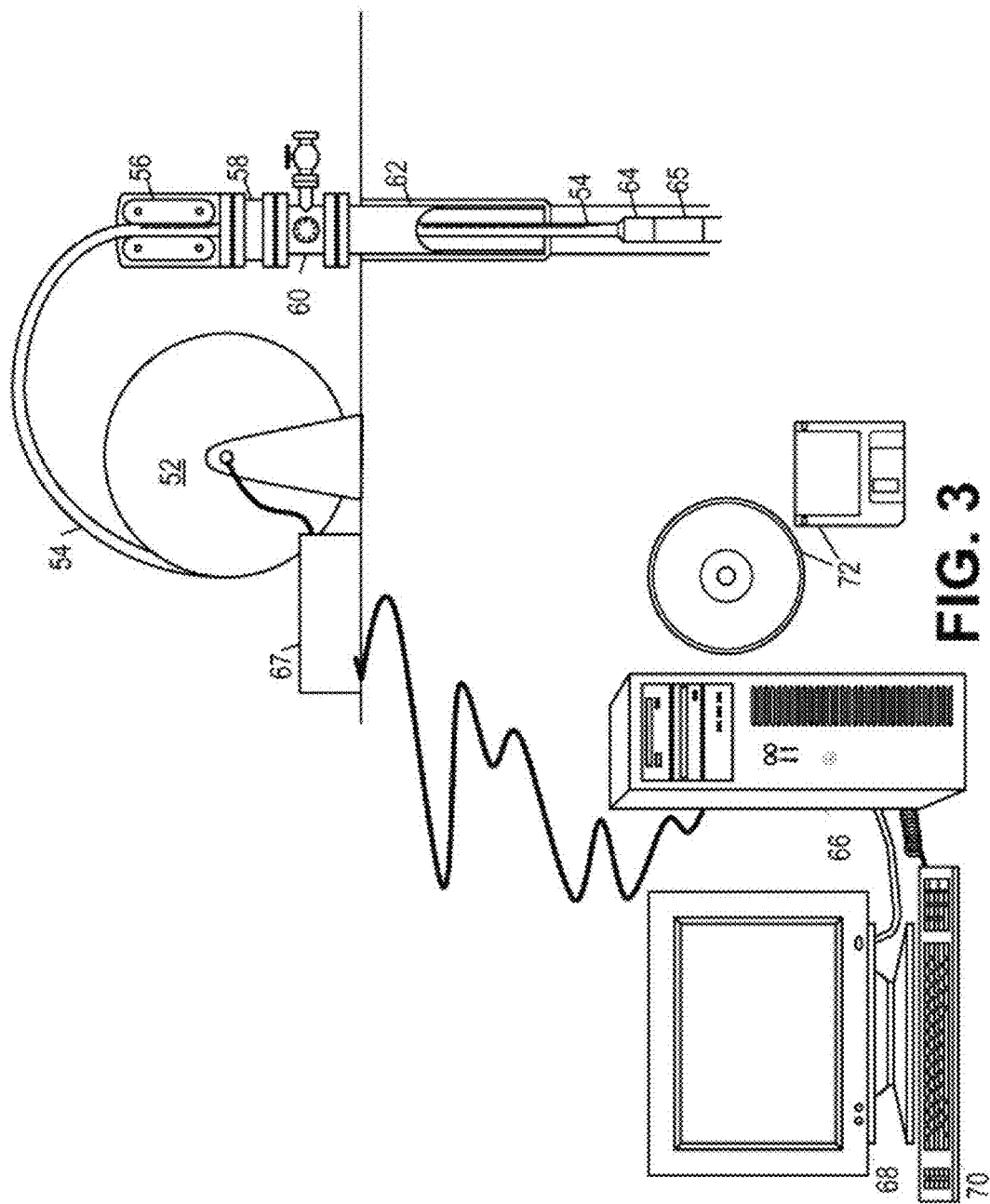
FIG. 3 shows an illustrative coil tubing logging system.

An alternative logging technique may be tubing-conveyed logging. FIG. 3 shows an illustrative coil tubing logging system in which coil tubing 54 may be pulled from a spool 52 by a tubing injector 56 and injected into a well through a packer 58 and a blowout preventer 60 into the well 62. In the well, a supervisory sub 64 and one or more logging tools 65 are coupled to the coil tubing 54 and configured to communicate to a surface computer system 66 via information conduits or other telemetry channels. An uphole interface 67 may be provided to exchange communications with the supervisory sub and receive data, to be conveyed to the surface computer system 66.

Surface computer system 66 may be configured to communicate with supervisory sub 64 to set logging parameters and collect logging information from the one or more logging tools 65 such as an NMR logging tool. A surface computer system 66 may be preferably configured by software (shown in FIG. 3 in the form of computer-readable storage media 72 including program instructions) to monitor and control downhole instruments 64, 65. The subsurface computer system 66 includes a display device 68 and a user-input device 70 to enable a human operator to interact with the program instructions 72.

In each of the foregoing logging environments, the logging tool assemblies preferably include a navigational sensor package that includes direction sensors for determining the inclination angle, the horizontal angle, and the rotational angle (a.k.a. "tool face angle") of the bottom hole assembly. As may be commonly defined in the art, the inclination angle is the deviation from vertically downward, the horizontal angle is the angle in a horizontal plane from true North, and the tool face angle is the orientation (rotational about the tool axis) or angle from the high side of the wellbore. In accordance with known techniques, wellbore directional measurements can be made as follows: a three-axis accelerometer measures the earth's gravitational field vector relative to the tool axis and a point on the circumference of the tool called the "tool face scribe line". (The tool face scribe line is typically drawn on the tool surface as a line parallel to the tool axis.) From this measurement, the inclination and tool face angle of the bottom hole assembly can be determined. Additionally, a three-axis magnetometer measures the earth's magnetic field vector in a similar manner. Or gyro sensors can be used to measure angular velocity. From the combined gyro, magnetometer and accelerometer data, the horizontal angle of the bottom hole assembly may be determined. A motion sensing unit can also be included to track the position of the tool. In many cases, the motion sensing unit can derive the position information from the direction sensors.

Figure 4:
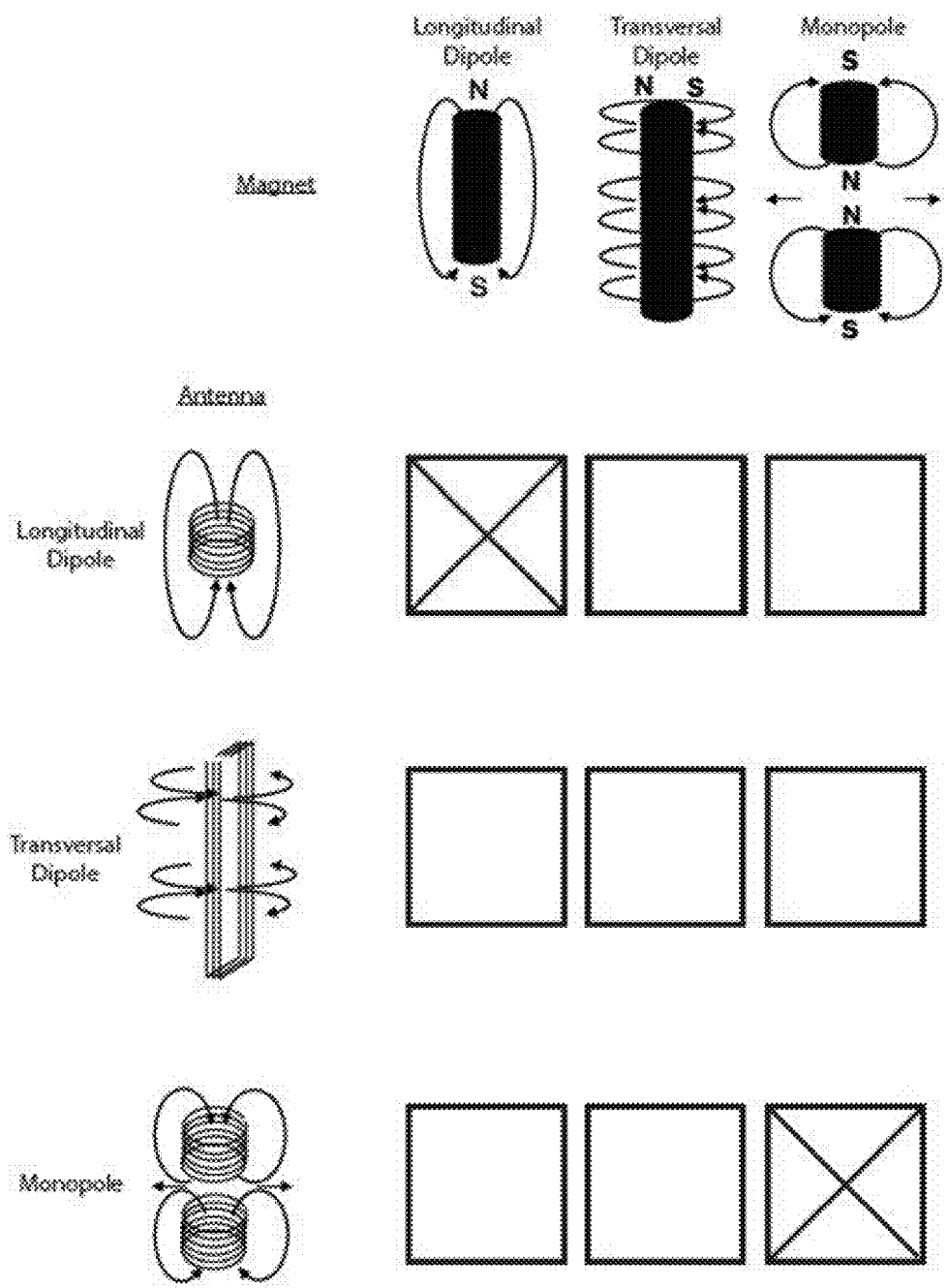
FIG. 4 shows views of illustrative magnet and antenna arrangements for all NMR tool designs.

FIG. 4 shows views of illustrative magnet and antenna arrangements for NMR tool designs. There are many elaborate magnet schemes to create the static magnetic field for down hole logging. The building blocks for all of these schemes are the basic available magnetic field dimensional possibilities, as shown in FIG. 4: longitudinal dipole, transversal dipole, and monopole. These three building blocks can be used for the antenna and the magnet. Different combinations of these basic fields will create different sensitivities to the signal. The creation of shaped static magnetic fields, B0 and the associated antenna field, B1 which may be best suited for an NMR experiment, may be different depending on the intended application for the NMR tool. For instance, for a drilling environment, axial symmetric or nearly axial symmetric magnet field designs are considered preferable. The creation of these magnet fields may include a magnet which may be composed of many pieces of magnet. The direction of those magnets may created a NMR active volume which vary from axial to transversal, or even in a monopole direction, where the direction of the material may be radial outward, or a combination thereof. The magnet may be created using magnet sections grouped together and placed at carefully designed spacings to get the desired magnetic field shape. Magnets in opposing magnetic direction to the other magnets in the main configuration may be placed to stretch, weaken, change the gradient, or shape the field. The magnet and antenna fields may be be created also with the addition of magnetically permeable material. The location of the magnetic permeable material is not limited to under the antenna, where being "under the antenna" means closer to the center of the tool radially than the antenna, but in most configurations, there will be some magnetically permeable material under the antenna. The antenna may be placed directly adjacent to the permeable magnetic material or have a specific spacing between the antenna and the material.

Magnet/antenna configurations may be created that have more than one sensitive volume. The sensitive volume is the volume from which NMR signal will be observed. Magnet/antenna configurations may be created that use more than one antenna. The additional antenna may be used to collect data from the more than one volume. However, in some cases a second antenna will collect data from the same sensitive volume. A third antenna might even be used to collect data from the same sensitive volume for select combinations. In the case where more than one antenna collects data from the same sensitive volume, it may be best if those antennas are orthogonal.

Combinations like monopole magnet with longitudinal dipole antenna, transversal dipole magnet with transversal dipole antenna, and longitudinal dipole magnet with transversal dipole create round enough magnetic fields to be used in a downhole drilling environment, as indicated in a combination matrix shown in FIG. 4. The only combinations which are not used because the signal will be practically zero are longitudinal dipole magnets with longitudinal dipole antennas and monopole magnets with monopole antennas, as indicated by X's in the combination matrix.

Figure 5A:
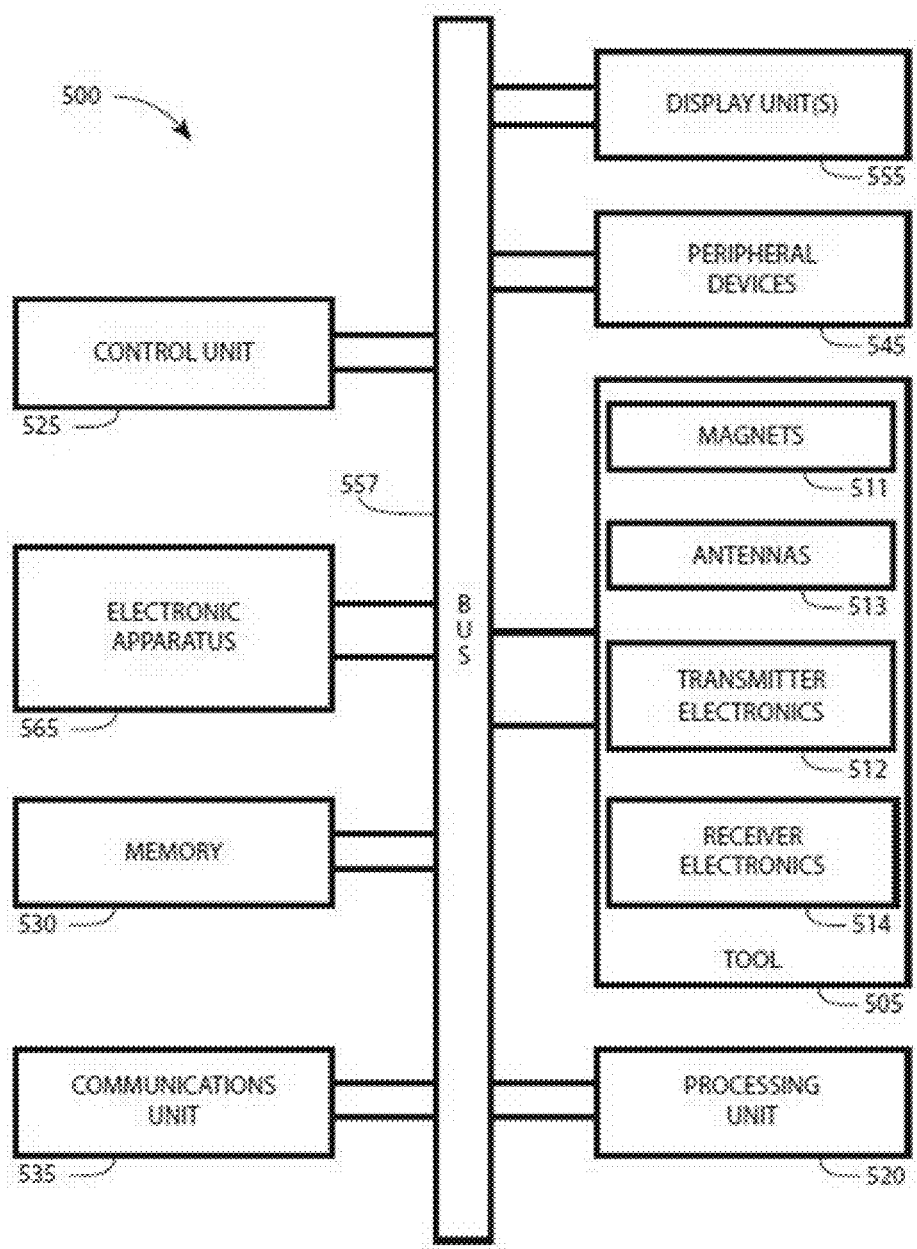
FIG. 5A is a block diagram of features of an example embodiment of a system operable to process nuclear magnetic resonance data and prepare for sending uphole.

FIG. 5A is a block diagram of features of an example embodiment of a system operable to process nuclear magnetic resonance data which may be less demanding to send uphole from an NMR logging tool 505, as described herein or in a similar manner. The system 500 can include the NMR tool 505 having an arrangement of magnets 511, antenna(s) 513, transmitter electronics 512, and receiver electronics 514. The system 500 can be configured to operate in accordance with the teachings herein.

The system 500 can include a control unit 525, a memory 530, an electronic apparatus 565, and a communications unit 535. The memory 530 can be structured to include a database. The control unit 525, the memory 530), and the communications unit 535 can be arranged to operate as a processing unit to control operation of the transmitter electronics 512 and the receiver electronics 514 and to perform operations on the signals collected by the receiver electronics 514 to process nuclear magnetic resonance data generated by the NMR logging tool 505. A processing unit 520, structured to process nuclear magnetic resonance data of the NMR logging tool 505, can be implemented as a single unit or distributed among the components of the system 500 including electronic apparatus 565. The control unit 525 and the memory 530 can operate to control activation of the transmitter electronics 512 to generate echo train sequences and recovery pulses. The control unit 525 and the memory 530 can operate to control selection of the receiver electronics 514 in the tool 505 and to manage processing schemes. The control unit 525, the memory 530, and other components of the system 500 can be structured, for example, to operate similar to or identical to the components discussed herein or similar to or identical to any of methods discussed herein.

The system 500 can also include a bus 557, where the bus 557 provides electrical conductivity among the components of the system 500. The bus 557 can include an address bus, a data bus, and a control bus, each independently configured or in an integrated format. The bus 557 can be realized using a number of different communication mediums that allows for the distribution of components of the system 500. Use of the bus 557 can be regulated by the control unit 525. Bus 557 can include a communications network.

In various embodiments, the peripheral devices 545 can include additional storage memory and other control devices that may operate in conjunction with the control unit 525 and the memory 530. In an embodiment, the control unit 525 can be realized as a processor or a group of processors that may operate independently depending on an assigned function. The system 500 can include display unit(s) 555, which can be used with instructions stored in the memory 530 to implement a user interface to monitor the operation of the tool 505 or components distributed within the system 500.

The components shown in FIG. 5A need not be distributed as shown. Some of the components may be located on the surface, some in the tool 505, some in other locations in the drill string 8, wireline logging tool 34, logging tools 65, or some other location in the systems illustrated in FIGS. 1, 2, and 3, and some may be distributed among those locations.

Figure 5B:
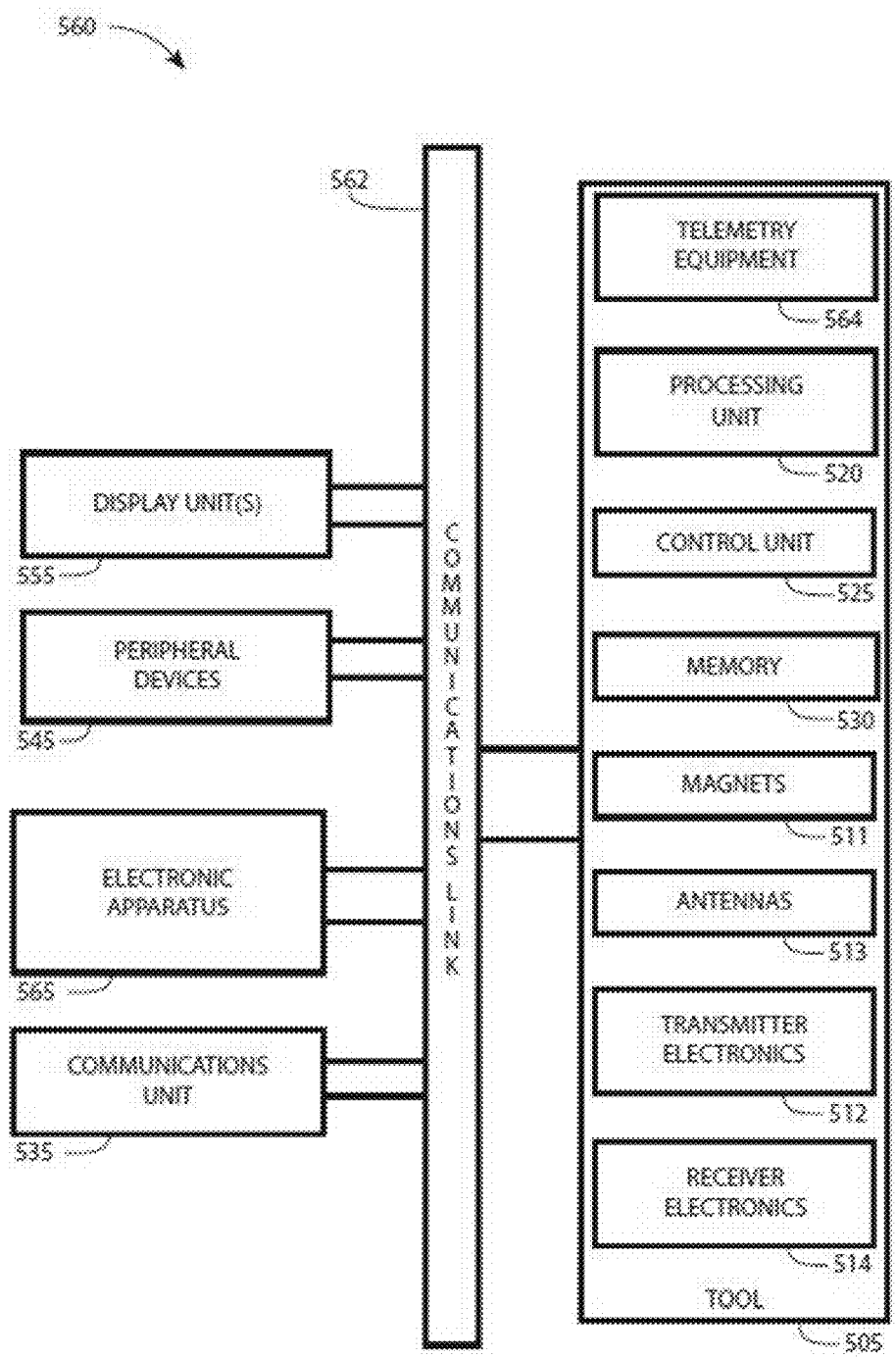
FIG. 5B is a block diagram of features of an example embodiment of a system operable to process nuclear magnetic resonance data.

FIG. 5B is block diagram of features of another example embodiment of a system operable to process nuclear magnetic resonance data of an NMR logging tool, as described herein or in a similar manner. In the system 560 illustrated in FIG. 5B, the processing unit 520, the control unit 525, and the memory 530 are located in the tool 505. The components in the tool 505 communicate via a communications link 562 using telemetry equipment 564 to communicate with, for example, the communications unit 535.

Figure 6:
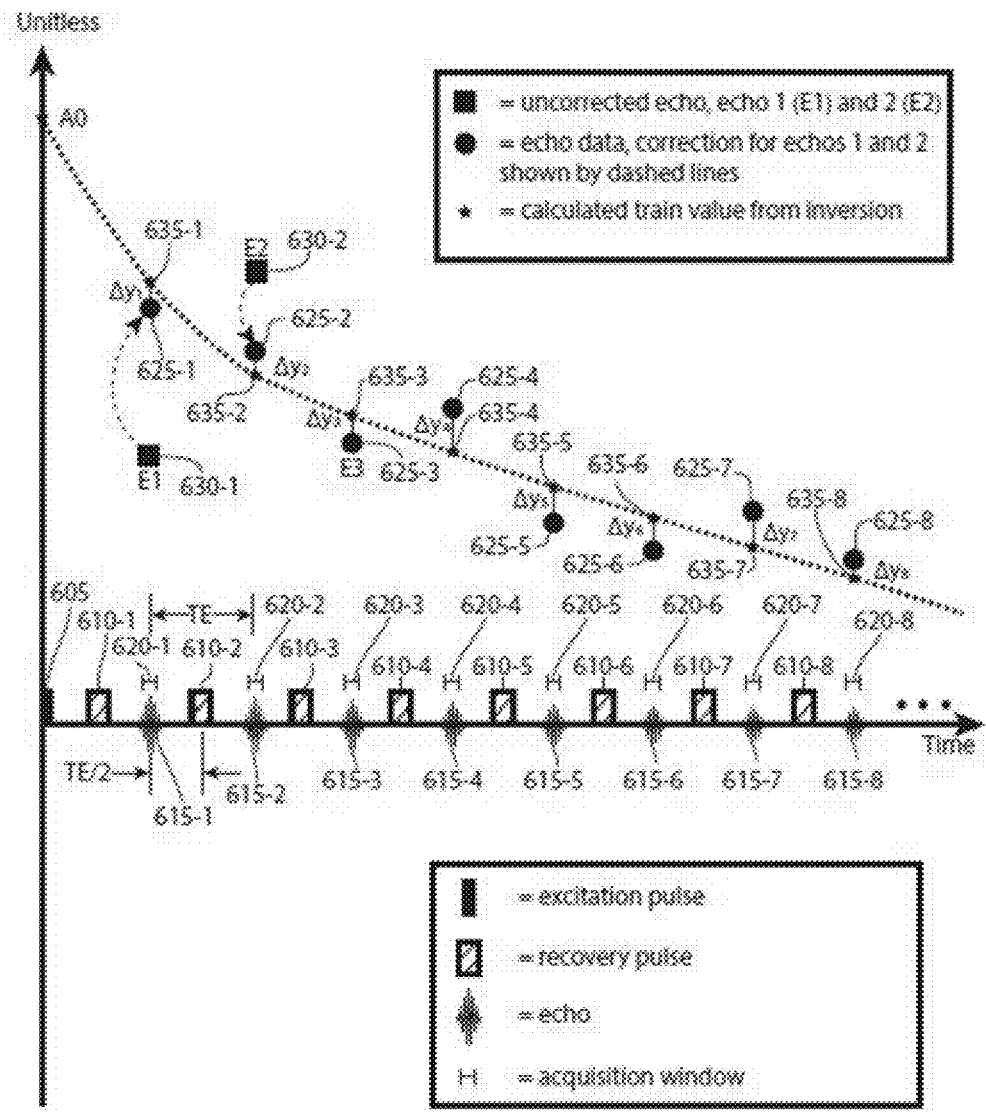
FIG. 6 is a representation of a CPMG sequence.

FIG. 6 is a representation of a CPMG sequence. FIG. 6 illustrates an excitation pulse 605 and a sequence of recovery pulses 610-1, 610-2, . . . , 610-8. In this non-limiting example sequence, eight recovery pulses 610-1, 610-2, . . . , 610-8 cause eight echoes 615-1, 615-2, . . . , 615-8, where the peak amplitudes of the echoes are equally spaced apart by a peak to peak time distance, TE (echo time), that corresponds to the equally spaced apart time distances of the recovery pulses. Recovery pulses are not limited to having equal space. Recovery pulses are not limited to eight pulses, but the number used may depend on the application and/or measurement parameters. Also indicated are acquisition windows 620-1, 620-2, . . . , 620-8 for capturing the signal of an echo, a first echo E1, a second echo E2, and a third echo E3. A0 is the amplitude of the echo train at time zero. A0 is not measured but is calculated by using an exponential decay fitting curve determined from the third echo E3 to the last echo. E1 and E2 can be included if they are corrected. These echoes decay according to the T2 of the medium. Magnetization will be allowed to recover fully or partially for the next sequence, then a medium can be probed again by another sequence.

A T1 experiment downhole consists of a flipping or nulling of the magnetization in the positive z direction through an inversion, excitation, or saturation pulse followed by a CPGM sequence. The time between the saturation pulse and the CPMG sequence, designated as wait time (WT), is varied in the τ(time) domain. This allows for the built-up magnetization in the z-axis to be measured. Any number of wait times can be used ranging from a minimum of 2 to a practical limit of about 100: for example, in practice, a minimum of 3 is used. There is no upper limit on how many WTs can be used: however, it is preferred to keep the number lower so that the vertical resolution of the data is kept minimal, battery life is extended if the tool is run on batteries, processing power downhole is usable, and stress on electronics is minimal.

Figure 7:
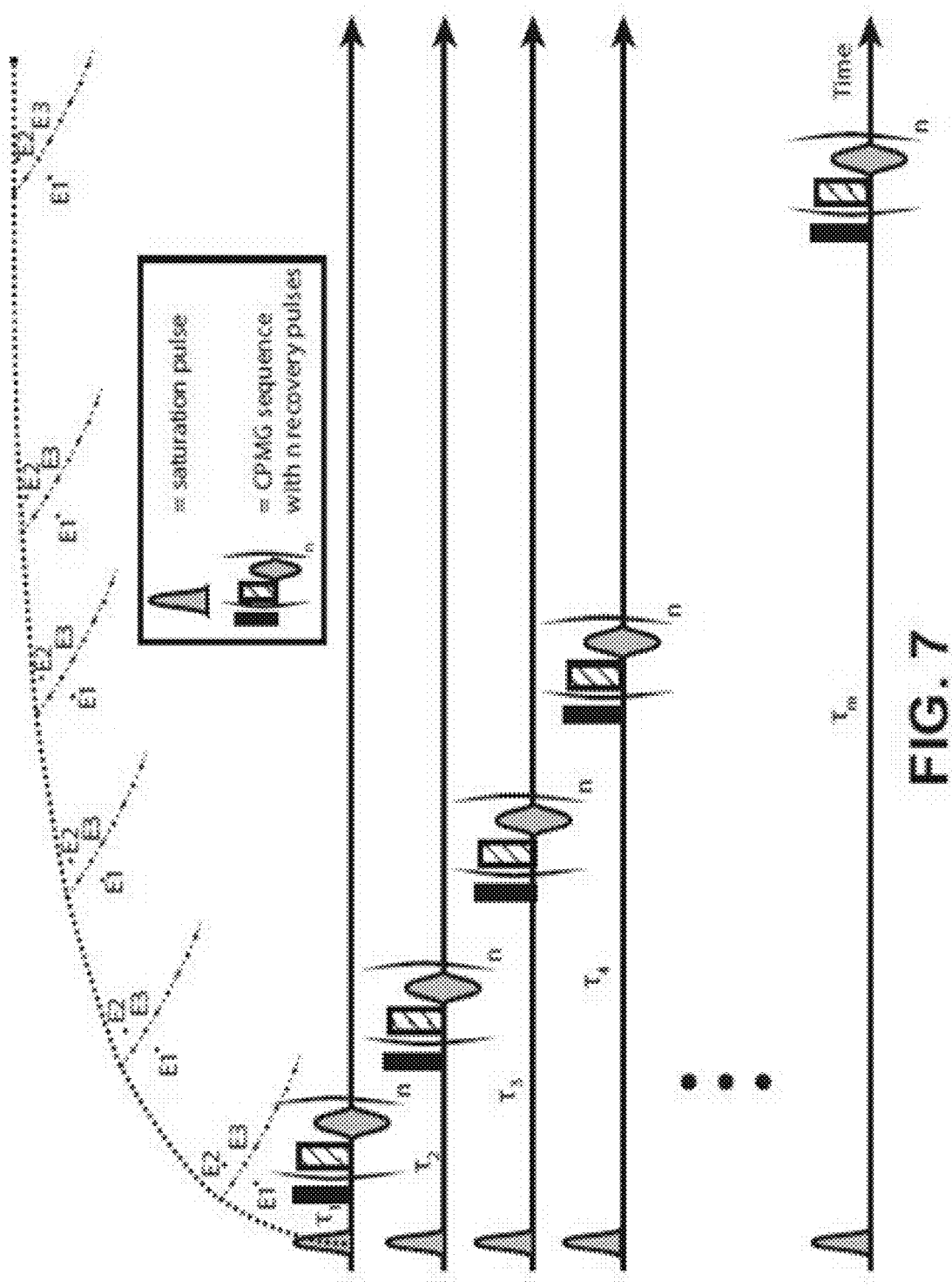
FIG. 7 is a diagram of a T1 experiment.

FIG. 7 is a diagram of a T1 experiment. The individual CPMGs for each WT can have any number of echoes. The WTs in FIG. 7 are as shown as τ1, τ2, . . . , τm. Commonly, the longest wait time can have a significantly larger number of echoes taken. Lower WTs do not need as many echoes as less magnetization has recovered and the data decays into the noise quickly.

The values in the echo train measurement 625-1, 625-2, . . . , 615-8, $Y_{result}$, are shown as solid circles immediately above or below their respective echoes in FIG. 6. The initial values calculated for echo 1 (shown as solid square 630-1) and echo 2 (shown as solid square 630-2) are corrected as indicated by the dashed arrows, to result in echo train measurements 625-1 and 625-2.

The NMR tool acquires echoes based on the pulse sequence used. Here, this data is designated as S(t). To interpret the data, S(t) may be inverted into a different basis: T2 (i.e., transverse relaxation), T1 (i.e., longitudinal recover time), or D (i.e., diffusion). The inversion produces spectrum components which are correlated to a time (T1 or T2) or diffusion axis. The spectrum can then be used to make petro-physical conclusions about the formation. To perform this inversion, the data may be fit to known answers.

$$S(t) = \sum_{uvh} x_{uv} \cdot A(T_{1U}, T_{2v}, D_h, t) \quad (1)$$

When the tool is stationary, the signal's known answer, omitting surface/volume interaction, depends on each wait time, diffusion coefficient, gradient, the time of the echo, T1, T2, and the TE. The signal from the tool only occurs with each echo and not a continuum of time and is referred to as y(n). The signal for the nth echo for the kth wait time and for the $s^{th}$ TE has the form:

$$y^{k,s}(n) = \sum_{h=1}^{r}\sum_{v=1}^{q}\sum_{u=1}^{p} x_{hvu} \cdot \left(1 - e^{-\frac{TW_k}{T_{1u}}}\right) \cdot e^{-\frac{t_n}{T_{2v}}} \cdot e^{-\frac{D_h(\gamma \cdot G_b \cdot TE_s)^2 \cdot t_n}{12}} \quad (2)$$

where:
$y^{k,s}(n)$ is the nth echo for the kth wait time for the $s^{th}$ TE,
q is the total number of T2 components,
p is the total number of $T_1$ components,
r is the number of diffusion constants,
n is the count of the echo in a single wait time,
s is the number of the TEs,
$x_{111} \ldots x_{pqr}$ are the amplitudes of the respective spectrum components,
$TW_k$ is the kth wait time,
$T_{21} \ldots T_{2q}$ are the $T_2$ time constants for each of the q factors,
$T_{11} \ldots T_{1p}$ are the $T_1$ time constants for each of the p factors,
$TE_s$ is the sth inter-echo time,
$t_n$ is the time when the nth echo is acquired,
$D_h$ is the $h^{th}$ diffusion constant,
$\gamma$ is the gyromagnetic ratio, and
$G_b$ is the average gradient for a single band b.

While equation (2) includes small assumptions, in practice equation (2) may be easier to use if simplified. The exact simplification used may vary based on the parameter targeted. Common simplifications for equation (2) use a ratio between T1 and T2, only a single TE, assume a single Gradient (G), and assume a constant diffusion (D).

$$y^k(n) = \sum_{i=1}^{p} x_i \cdot \left(1 - e^{-\frac{TW_k}{T_{1i}}}\right) \cdot e^{-\frac{n \cdot TE}{T_{2i}}} \cdot e^{-\frac{D(\gamma \cdot G \cdot TE)^2 \cdot n \cdot TE}{12}} \quad (3)$$

where:
$y^k(n)$ is the nth echo for the kth wait time,
p is the total number of $T_1$ components, T1 components are also known as bins,
$x_1 \ldots x_p$ are the amplitudes of the respective spectrum components,
$TW_k$ is the kth wait time,
$T_{11} \ldots T_{1p}$ are the $T_1$ time constants for each of the p factors,
$T_{21} \ldots T_{2p}$ are the $T_2$ time constants for each of the p factors (note that to eliminate the j dimension of the x matrix in equation (1) and thereby simplify equation (2), $T_{2j}$ is assumed to be proportional to $T_{1i}$ so that $T_{2j}$ & $T_{1i}$ for all i and j for a particular wait time $TW_k$ and $T_{2j}$ is renamed $T_{2i}$),
TE is the inter-echo time (note that, to simplify equation (2), only one inter-echo time is assumed),
D is the diffusion constant,
$\gamma$ is the gyromagnetic ratio, and
G is the gradient.

Now equation (1) simplifies likewise to:

$$S(t) = \sum_{i} x_i \cdot A(T_{1i}, T_{2i}, t) \quad (1A)$$

The signal can be connoted in many ways. A simple way to handle the data may be to form it into a simple vector where one wait time's echoes are followed by the next wait time's echoes. Equation (3) can be used to expand equation (1A) to form a matrix of known results for all wait times and echoes as below:

$$\begin{bmatrix} TW_1 & \begin{bmatrix} y^1(1) \\ y^1(2) \\ \vdots \\ y^1(n_1) \end{bmatrix} & \begin{bmatrix} A^1_{11} & A^1_{21} & \cdots & A^1_{p1} \\ A^1_{12} & A^1_{22} & \cdots & A^1_{p2} \\ \vdots & \vdots & \vdots & \vdots \\ A^1_{1n_1} & A^1_{2n_1} & \cdots & A^1_{pn_1} \end{bmatrix} \\ TW_2 & \begin{bmatrix} y^2(1) \\ y^2(2) \\ \vdots \\ y^2(n_2) \end{bmatrix} & \begin{bmatrix} A^2_{11} & A^2_{21} & \cdots & A^2_{p1} \\ A^2_{12} & A^2_{22} & \cdots & A^2_{p2} \\ \vdots & \vdots & \vdots & \vdots \\ A^2_{1n_2} & A^2_{2n_2} & \cdots & A^2_{pn_2} \end{bmatrix} \begin{bmatrix} x_1 \\ x_2 \\ \vdots \\ x_p \end{bmatrix} \\ \vdots & & \vdots \\ TW_m & \begin{bmatrix} y^m(1) \\ y^m(2) \\ \vdots \\ y^m(n_m) \end{bmatrix} & \begin{bmatrix} A^m_{11} & A^m_{21} & \cdots & A^m_{p1} \\ A^m_{12} & A^m_{22} & \cdots & A^m_{p2} \\ \vdots & \vdots & \vdots & \vdots \\ A^m_{1n_m} & A^m_{2n_m} & \cdots & A^m_{pn_m} \end{bmatrix} \end{bmatrix} \quad (4)$$

Where m is the total number of WTs, $A_{ij}^k = A_{T2\ bin,\ echo\ number}^{WT\ number}$ is a basis function that can be used to invert the data into the $T_1$ or $T_2$ time domains, and j is the count of echoes in a sequence of wait times.

For an average gradient and single TE:

$$A_{ij}^k = A_{T2\ bin,\ echo\ number}^{WT\ number} = \left(1 - e^{-\frac{TW_k}{T_{1i}}}\right) \cdot e^{-\frac{j \cdot TE}{T_{2i}}} \cdot e^{-\frac{D(\gamma \cdot G \cdot TE)^2 \cdot n \cdot TE}{12}} \quad (5A)$$

Equation (5A) is a basis function that can be used to invert the data into the T1 or T2 time domain with the coefficients being used as a spectrum in those domains. Other basis functions are possible.

For example, a basis function may only involve T2. In the case where only a single WT is used and only a T2 inversion is being done, a basis function that can be inverted to determine T2 only may be:

$$A_{ij}^k = e^{-\frac{j \cdot TE}{T_{2i}}} \cdot e^{-\frac{D(\gamma \cdot G \cdot TE)^2 \cdot n \cdot TE}{12}} \quad (5B)$$

Further, the basis function is not limited to exponentials. A may be approximated linearly, such as that shown in Equation (5C):

$$A_{ij}^k = \left(1 - \frac{j \cdot TE}{T_{2i}}\right) \cdot e^{-\frac{D(\gamma \cdot G \cdot TE)^2 \cdot j \cdot TE}{12}} \quad (5C)$$

A may be approximated quadratically, such as that shown in Equation (5D):

$$A_{ij}^k = \left(1 - \frac{j \cdot TE}{T_{2i}} - \frac{1}{2}\left(\frac{j \cdot TE}{T_{2i}}\right)^2\right) \cdot e^{-\frac{D(\gamma \cdot G \cdot TE)^2 \cdot j \cdot TE}{12}} \quad (5D)$$

or A may be approximated with a higher order approximation. In another example there are circumstances where assuming a ratio between T1 and T2 cannot not be used. Such is the case in a circumstance where a T1/T2 simultaneous inversion for a T1/T2 map needs to be created. A basis function may be created without assumptions about the ratio between T1 and T2 for a T1/T2 simultaneous inversion for a single TE, such as that shown in equation (5E).

$$A_{uvj}^k = \left(1 - e^{-\frac{TW_k}{T_{1u}}}\right) \cdot e^{-\frac{t_j}{T_{2v}}} \cdot e^{-\frac{D(\gamma \cdot G \cdot TE)^2 \cdot j \cdot TE}{12}} \quad (5E)$$

This basis function has more dimensions than those previously shown, and the A basis is now a 3-dimensional matrix. In this circumstance equation (2) is used to expand equation (1) for the inversion. The above equation (4) can be shortened as:

$$Y = AX \quad (6-1)$$

where:

$$Y = \begin{bmatrix} y^1(1) \\ y^1(2) \\ \vdots \\ y^1(n_1) \\ y^2(1) \\ y^2(2) \\ \vdots \\ y^2(n_2) \\ \vdots \\ y^m(1) \\ y^m(2) \\ \vdots \\ y^m(n_m) \end{bmatrix}, \quad (6\text{-}1a)$$

$$A = \begin{bmatrix} A^1_{11} & A^1_{21} & \cdots & A^1_{p1} \\ A^1_{12} & A^1_{22} & \cdots & A^1_{p2} \\ \vdots & \vdots & \vdots & \vdots \\ A^1_{1n_1} & A^1_{2n_1} & \cdots & A^1_{pn_1} \\ A^2_{11} & A^2_{21} & \cdots & A^2_{p1} \\ A^2_{12} & A^2_{22} & \cdots & A^2_{p2} \\ \vdots & \vdots & \vdots & \vdots \\ A^2_{1n_2} & A^2_{2n_2} & \cdots & A^2_{pn_2} \\ \vdots & \vdots & \vdots & \vdots \\ A^m_{11} & A^m_{21} & \cdots & A^m_{p1} \\ A^m_{12} & A^m_{22} & \cdots & A^m_{p2} \\ \vdots & \vdots & \vdots & \vdots \\ A^m_{1n_m} & A^m_{2n_m} & \cdots & A^m_{pn_m} \end{bmatrix}, \quad (6\text{-}1b)$$

$$X = \begin{bmatrix} x_1 \\ x_2 \\ x_3 \\ \vdots \\ x_p \end{bmatrix}, \text{ and} \quad (6\text{-}1c)$$

The A matrix shown above can be two dimensional or three dimensional. Generally, Y is a vector of echoes taken in a sequence called an "activation." The A matrix is the basis function matrix created to fit the data. And X is the vector of coefficients which minimize the difference between the data and basis function. X is also a vector of coefficients which create the spectrum when plotted against the T1, T2, or D basis axis.

The spectrum vector X is given by:

$$X = A^{-1} Y \quad (6\text{-}2)$$

When the NMR tool is moving at a speed v, the stationary equations above no longer apply. A taking into account the moving speed is A(v). The corresponding Y is Y(v). X remains the same because X may be an intrinsic property of the formation. There are many factors in the echo train that can change while in motion. There is the polarization of the T1, captured in a T1 sequence. There is the decay of the echo train captured by a CPMG, or CPMG derived sequence. There are inflicted phases that are similar to a diffusion measurement, captured by doing a diffusion editing like sequence. However, in an adiabatic condition these phases may not be observed.

When the tool is in motion, equation (6-1) can be re-written as:

$$Y(v) = A(v)X \qquad (7-1)$$

The inversion can be done using the equation (7-1) producing a solution as in equation (7-2):

$$X = A(v)^{-1}Y(v) \qquad (7-2)$$

If the inverse of the stationary matrix A is used in equation (7-2), the result is:

$$X^* = A^{-1}Y(v) = A^{-1}A(v)X \qquad (7-3)$$

In this method, X is not found directly during the inversion and a correction needs to be done. Since A(v) is different from the stationary A due to B0 inhomogeneity, $A^{-1}A(v)$ is not equal to the unit matrix 1, which means that X* is not the same as X. In other words, if the stationary matrix A is used with data collected with the NMR tool is moving, an error is created. This is called motion effect. Consider corrections to X*. The term X* can be corrected by the following equation:

$$X = A(v)^{-1}AX^* \qquad (8)$$

where $A(v)^{-1}A$ is called the motion correction matrix.

The term A can be calculated directly. As shown above, constructing the A(v) matrix under non-zero speed is a key to removing motion effect. Correct inversion can be achieved either by using A(v) (motion dependent) in inversion or by using the stationary A and then correcting as in equation (8).

As discussed above, the column vector in A(v), Vector $A_i^k$ (equation 6-1 e), is the combined echo trains with all recovery times TW1, TW2, . . . and TWm, but the same T1 time constant and T2 time constant for each recovery time. If B0 is known, the A(v) matrix can be calculated either analytically or through simulation. Because A(v) is a function of speed and T1/T2 values, the combination of a different speed and different T1/T2 value is big, the amount of computation is huge. One way to reduce computation is to decrease the number of different speeds but interpolate/extrapolate to correct speed. Another technique is to adjust the number of T1/T2 components (bins).

To calculate A(v) correctly is not a simple matter. A simplification can be made where a simple cylinder shape is considered for the volume. In this case analytical equations can be created for the T2 echo losses in A(v) such as:

$$A(v) = (1 - ROP*n*TE)*s(t)$$

With the complex shapes of the magnetic field, the correct A(v) does not have a simple analytical form. One way of creating A(v) more accurately includes procedures to simulate the echo train completely mathematically using the knowledge of B0 and B1. Because this calculation is time consuming, one set of A(v) can be made using the theoretically perfect B0 and B1, instead of by measuring the field from each real logging tool with a Gauss meter and creating A(v) for each tool.

The magnetic and rf fields can be meshed into small voxels, where each voxel has a B0, B1, and an amount of micro magnetization. A finer mesh provides more accurate echo trains, however, becomes more and more computationally challenging. The tool's response, emf, from any voxel, as in the gridded space of FIG. 10 (discussed below), can be calculated using the principle of reciprocity, as outlined in Hoult, D., 2000, The principle of reciprocity in signal strength calculations— A mathematical guide: Concepts of Magnetic Resonance, 12, (4), 173-187. Then, the micro magnetizations are followed through time using the Bloch equation or rotation matrices. In this way, different A(v) can be found for different ROPs and T1.

$$A(v, T1, ROP) \propto \int\int\int^V \text{micro magnetization}(t, T1, ROP) dx\, dy\, dz \qquad (9)$$

Figure 8:
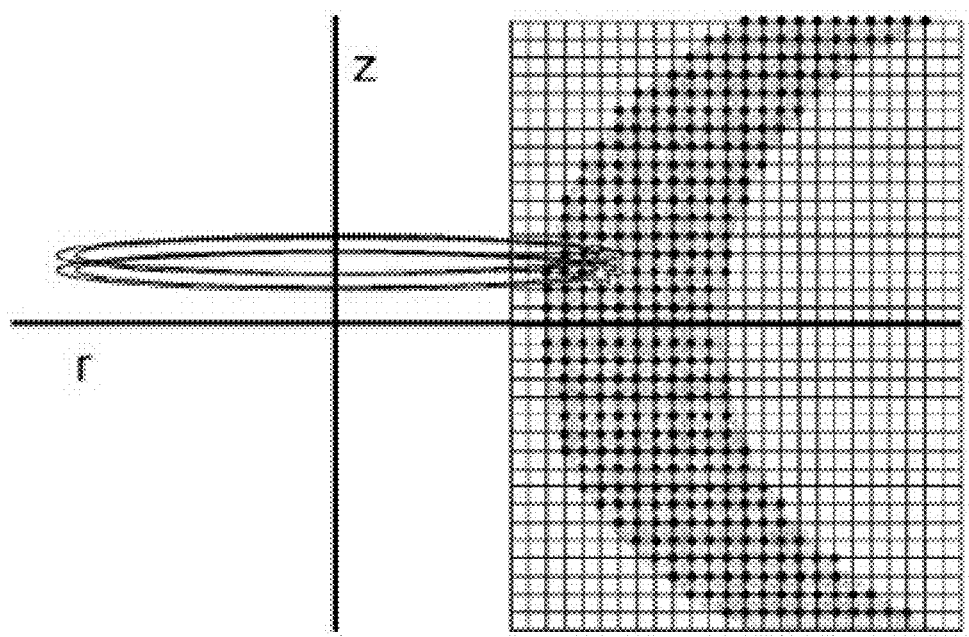
FIG. 8 is a pictorial of a selected sensitive region in a magnetic field.
Figure 9:
FIG. 9 is a representation of a rotationally symmetric voxel.

FIG. 8 is a pictorial of a selected sensitive region in a magnetic field. This field is split into many voxels. At each voxel a micro magnetization, uses the time dependent B1 and the B0 to calculate a signal for a specific time. That micro magnetization is rotated using excitation and refocusing pulses at specific times to obtain a theoretical echo train. FIG. 9 is a representation of a rotationally symmetric voxel. This allows a simplification in the calculation to go from 3D to 2D using the annulus volume.

Creating the A(v) can be performed using the following steps. First, a zero ROP emf, where the emf is a stimulated signal picked up in the coil which created the B1, is found just as a calibration would be performed on the tool. This allows to rescale the A(v) into the units of porosity instead of in voltage units.

For non-zero ROP calculations, it is simplest to use the tool as a reference frame, that is, as if the tool were stationary and the formation continually moving, however the opposite can also be done. In this case, the magnetization field is moved in relation to the B0 and B1 fields at the ROP. The magnetization, M(t), is a function of speed v, T2 decay, T1 recovery time, B0, and B1. A steady state micro magnetization vector is created for each volume with the micro magnetization aligned with B0. The direction of B0 in each voxel can be designated as: $\hat{z}=[0\ 0\ 1]$. For a motion along the tool, the calculation is in the adiabatic case, and the Barry phase is not an issue. However, if calculating for other motions such as the vibrational plane the Barry phase should be accounted for, or smaller voxels and time increments used.

The sensitive volume is then selected from the B0 field using the tool operating frequency and pulse duration or Fourier transformation of a realistic pulse. The saturation/inversion pulse is used to null/invert the magnetization in that sensitive volume. Typically, a saturation/inversion pulse can have a bandwidth between ±3 to ±10% of the tool's operating frequency. It generally will be larger than the excitation pulse's bandwidth. If only a T2 sequence in motion is to be calculated there would be no saturation/inversion pulse.

The micro magnetization is then allowed to recover for a total time equaling the wait time. Recovery occurs in small time increments, Δt, using the following equation:

$$M_{t_{i+1}} = (M_{t_i} + (\chi B_0 - M_{t_i}))(1 - e^{-\Delta t/T_1})\hat{z} \quad (10)$$

where M is the micro magnetization to be integrated over, and $\hat{z}$ is the unit vector in the direction of local z, and x is the magnetic susceptibility.

The excitation can be performed with or without considering the pulse width. Without considering the pulse shape and timing, the pulse is computed as an instantaneous event. More complex considerations of the pulse can be done, however, for simplicity only this one is discussed. The excitation pulse can be done with any phase. The refocusing pulse then is best when it is shifted 90° out of phase from the excitation pulse. For example, the excitation pulse could be along the "x" axis, while the refocusing pulse is along the "y" axis. The micro magnetization vector is then rotated using the rotation matrix. For the case of an "x" pulse $$R_x(\theta) = \begin{bmatrix} 1 & 0 & 0 \\ 0 & \cos\theta_{tipE} & -\sin\theta_{tipE} \\ 0 & \sin\theta_{tipE} & \cos\theta_{tipE} \end{bmatrix} \quad (11)$$

The tipping angle, θtipE, for each voxel is determined using the strength of B1 perpendicular to B0, B1n, at the voxel's location:

$$\theta_{tipE} = \pi\gamma B_{1n}\tau_{excitation} \quad (12)$$

Where γ is the gyromagnetic ratio and $\tau_{excitation}$ is the duration of the excitation pulse.

Following the excitation pulse, the micro magnetization is allowed to process freely around the static field for ½ TE, where TE is the echo time. From the Bloch equation, it is known that magnetization undergoes a precession under the influence of a magnetic field, which can be simply represented as a rotation:

$$R_z(\theta) = \begin{bmatrix} \cos\theta_{FID} & -\sin\theta_{FID} & 0 \\ \sin\theta_{FID} & \cos\theta_{FID} & 0 \\ 0 & 0 & 1 \end{bmatrix} \quad (13)$$

During this time, the magnetization is still recovering by means of equation (12). So, the rotation also performed in small time increments, $$\theta_{F/D} = 2\pi\gamma B_0 \Delta t$$

until a total time of ½ TE has passed.

During the free induction decay (FID), it is easy to assess that magnetization spreads within a couple hundred microseconds to the point where no signal would be measured, making the reason for a recovery pulse obvious.

The first step to recovering the magnetization is to perform a pulse, which will flip the fast and slow spins' phases. Ideally, this would be a 180° pulse: but, as with the excitation pulse, the exact rotation each voxel undergoes will be dependent on the B1n.

$$R_y(\theta) = \begin{bmatrix} \cos\theta_{tipR} & 0 & \sin\theta_{tipR} \\ 0 & 1 & 0 \\ -\sin\theta_{tipR} & 0 & \cos\theta_{tipR} \end{bmatrix} \quad (14)$$

where:

$$\theta_{tipR} = \pi\gamma B_{1n}\tau_{recovery}. \quad (14\text{-}1)$$

Where $\tau_{recovery}$ is the duration of the recovery pulse, aka the pulse intended to be a 180° pulse.

This calculation is repeated for all the wait times in the T1 experiment and for T1 spanning a range of time, for example, between 0.001 s and 10 s, or all the TEs, or all the T2 decays desired to be investigated in the pulse sequence. For very small T1 s the motion effect will be minimal. So, for T1 between 0.001 s and 0.5 s, for instance, the results of equation 2 or any of its simplifications could be used in place of the model.

The porosity overcall can be correctly accounted for using a more accurate A matrix during inversion processing. Porosity over call is one of the motional effects. In some cases, the porosity may have an under call if the magnetic field preceding the sensitive volume is lower. The term over call is meant to capture any mismatch of the porosity due to motion from the calibrated stationary measurement. There are two ways to gain too much polarization in relation to the stationary measurement. The first is that the movement causes the sensitive region to move out of the "nulled" zone during the saturation/null pulse. Thus, instead of a partial recovery there is part of the volume that has full recovery. The second mechanism by which the porosity can over call is by magnetization which relaxed within a higher magnetic field moved into the sensitive region faster than the magnetization could reach a new equilibrium. These two effects stack onto each other in most cases since the slowest drilling speed is around 40 ft/hr. The A matrix, A(v), can be constructed for a number of different speeds with different T1 s. Although this technique requires long computational time for developing the A(v)s, it only requires being performed once. For low-gradient logging tools, the method proves to be very accurate. In tests, data generated had an average overcall of 2 PU (porosity units) attributed to the motion effects on a short aperture. Applications of one or more techniques taught herein may also provide real-time application as data is logged at a well site.

The inversion may be be done by many methods including singular value decomposition (SVD), regularization, or another inversion method for minimizing the fitting error. Such inversions may be done on the uphole inversion or the downhole inversion.

X coefficients may be interpreted to determine formation characteristics. The term "bin" is mentioned above (see, e.g., Equation (5)). A bin may be the time (either the T1 or T2 time) to which the X coefficient corresponds. For example, using the basis function in Equation (5), x1 corresponds to the T11 or T21 time. Thus, conventionally, the data to be telemetered to the uphole processing system is the X coefficient (e.g., x1) and the T11 or T21 time.

Split Inversion and Compact NMR Data Formats

As discussed herein, NMR data may be inverted. For example, echo processing may include acquiring echo trains downhole, stacking and/or filtering of the echo trains, and inverting the stacked and/or filtered echo trains to give spectrum coefficients. In some instances, the spectrum coefficients may be further compressed (such as by techniques described herein), and then transmitted uphole where they can be used to calculate partial porosities, permeabilities, and display the spectrum.

Some implementations may perform a split inversion process, whether it is a stationary-type inversion or a motion inclusive inversion. The split inversion may include a first inversion performed downhole and a second inversion performed uphole. The split inversion process may include acquiring echo trains downhole and stacking and/or filtering of the echo trains. Downhole, a first inversion may be performed downhole on the echo trains to determine spectrum coefficients. The spectrum coefficients may be transmitted in a compact data format to the surface where they may be used to re-calculate specific echoes (also referred to as "reconstructed echoes"). At the surface, the reconstructed echoes may then be inverted a second time using the same number of bins which were used for post processing. The second inversion may include a different basis function than the first inversion. The first inversion may use a basis function as in the stationary case while the second inversion may use a motion inclusive basis function. The basis for the motion inclusive inversion may be calculated from spin dynamics or from an equation which has motional effects accounted for.

In the split inversion process, after performing the first inversion downhole, some implementations may compress the spectrum coefficients into a more compact format. As discussed, the spectrum coefficients resulting from inversion may correspond each to a T1, T2, or combination of T1/T2 bins (other inversions may include a diffusion, gradient, or T1p axis). Some implementations may represent the spectrum coefficients with a monotonically increasing function. Based on the monotonically increasing function, the spectrum coefficients may be represented in a cumulative sum vector in which each vector entry is a cumulative sum of all previous spectrum coefficients in the cumulative sum vector. Hence, the spectral coefficients may be represented in a cumulative sum vector in which each entry is a cumulative sum of all previous entries. The vector may be of any suitable size and may be instantiated in any suitable computer memory device in any suitable programming language format. FIG. 10 illustrates an example scalar vector. In FIG. 10, the scalar vector 1000 includes the following scalar values: {a, b, c, d e, f}. The scalars included in the scalar vector 1000 may represent spectrum coefficients, such as those shown in Equation 6-1c. The term "vector" refers to a list of elements, where each element may be referred to as an entry in the vector or an entry in the list.

FIG. 11 shows an example cumulative sum vector 1100 including spectral coefficient data. The entries in the cumulative sum vector 1100 may represent a cumulative sum of spectral coefficients shown in the scalar vector 1000. In FIG. 11, the cumulative sum vector 1100 includes the following entries: {a, a+b, a+b+c, a+b+c+d, a+b+c+d+e, a+b+c+d+e+f}. Each entry in the cumulative sum vector 1100 may be formed by iteratively taking a corresponding entry in the scalar vector 1000 and adding all preceding entries in the scalar vector 1000. The iterative process may begin with the first entry 1001 in the scalar vector 1000 and proceed through the last entry 1004— thereby creating corresponding entries in the cumulative sum vector 1100. The first entry 1001 in the scalar vector 1000 has no preceding entries, so the first entry 1101 in the cumulative sum vector 1100 includes only the value of the first entry 1001 in the scalar vector 1000. All successive entries in the cumulative sum vector 1100 include a sum of the current corresponding entry in the scalar vector 1000 plus all preceding entries in the scalar vector 1000. In many instances, the spectrum coefficients may have high variance from the smallest bin to the largest bin. However, the difference between each vector entry and the next may be relatively small (e.g., particularly for the last few entries). Before transmitting the cumulative sum vector 1100 (i.e., a representation of the spectral coefficients) to the surface, some implementations may reduce the number of entries of the cumulative sum vector 1100, such as by down sampling the cumulative sum vector 1100.

The cumulative sum may be down sampled to include fewer points than there are bins. The down sampling may be done with preset entries or in an instantaneous adaptive selection way. The down-sampling may or may not be evenly spaced in spectrum domain. If the down-sampled points may be further compressed. For example, if a Delta compression is used and the last 10 entries are all the same, then only the first and the last entry with the same values are needed. After the cumulative sum is down sampled, further compressional methods can be used. Delta compression may be one suitable compression technique. FIG. 12A shows an example vector created by down sampling the cumulative sum vector 1100. A down sampled vector 1200 may be formed by down sampling the cumulative sum vector 1100. As an example, the down sampled vector 1200 may include a subset of entries from the cumulative sum vector 1100. As shown, the down sampled vector 1200 includes entries corresponding to entries 1, 3, and 5 of the cumulative sum vector 1100 but omits entries 2, 4, and 6 of the cumulative sum vector 1200.

FIG. 12B shows an example vector created by performing delta compression on the down sample vector 1200. One suitable delta compression technique may iteratively process each element of the down sampled vector 1200 to create entries in a delta compression vector 1201. Each entry in the delta compression vector 1201 may include a difference value indicating a difference between a current entry in the down sampled vector 1200 and a previous entry in the down sampled vector 1200. The first entry in down sampled vector 1200 has no preceding entry, so the first entry in the delta compression vector 1200 is identical to the first entry in the down sampled vector 1200. When using delta compression, the number of bits needed to send the spectrum coefficient data uphole may be less than the spectrum coefficients. For example, when spectrum coefficients correspond to T2, the techniques for representing spectrum coefficients in a compact format may require fewer bits than previous techniques. Under the previous methods, a select number of echoes may be reconstructed and then sent up hole. However, for a T2 sequence with a high number of echoes, even if 100x fewer echoes were used, the spectrum coefficients may still require more communication throughput than is available for sending the NMR data uphole.

After the spectrum coefficients are transmitted to the surface, the delta compression may be undone to form the down sampled vector in which the entries represent the spectrum coefficients. For example, the delta compression may be undone by reversing the above-noted process for delta compression. The removed points from the down sampled cumulative sum may be interpolated at this point. Similarly, the cumulative sum may be undone to achieve a vector representing the spectrum coefficients, such as the spectrum coefficients shown in Equation 6-1c.

Figure 13:
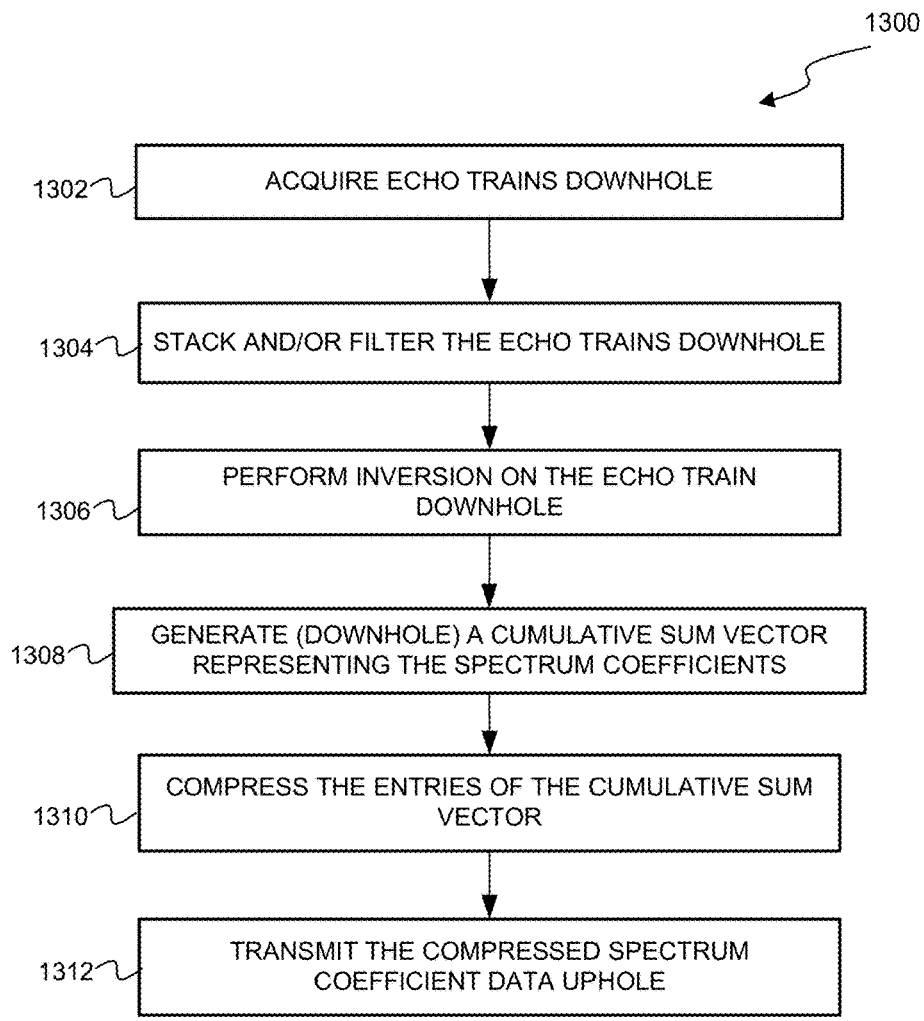
FIG. 13 is a flow diagram illustrating operations for a first phase of a split inversion process including a first inversion of NMR data.

FIG. 13 is a flow diagram illustrating operations for a first phase of a split inversion process including a first inversion of NMR data. The operations shown in FIG. 13 may occur in a downhole environment, such as a wellbore. In FIG. 13, the flow: 1300 begins at block 1302 where an NMR logging tool (e.g., NMR logging tool 505) may acquire echo trains in a wellbore or other downhole environment.

At block 1304, the NMR logging tool may stack and/or filter the echo trains. The NMR tool may perform any suitable stacking and/or filtering techniques on the echo trains.

At block 1306, the NMR logging tool may perform an inversion on the echo trains. In some implementations, the inversion produces a vector of spectrum coefficients, such as those described with respect to Equation 6-1c.

At block 1308, the NMR logging tool may generate a cumulative sum vector representing spectral coefficients. The cumulative sum vector may be similar to the cumulative sum vector 1100 of FIG. 11.

At block 1310, the NMR tool may compress entries of the commutative some vector. The NMR tool may utilize any suitable compression technique that reduces the number of bits needed for representing the spectrum coefficients. For example, the NMR tool may perform delta compression on the cumulative sum vector (see discussion of FIG. 12).

At block 1312, the NMR logging tool may transmit the compressed data uphole to a computer at the surface (such as the surface computer system 66). The compressed data may include compressed representations of the spectrum coefficients attained via the above-noted inversion process.

Hence, according to some implementations, a first phase of a split inversion process may generate spectrum coefficients with which computers at the surface can reconstruct echo trains that were captured down hole. The first phase of the split inversion process also may reduce the amount of information (e.g., binary digits) needed to represent the spectrum coefficients. Therefore, the first phase of the split inversion may enable transmission of information used for reconstructing echoes over a low bandwidth communication channel between the NMR logging tool 505 and the surface computer system 66. The second phase of the split inversion process may decompress the spectrum coefficient data and utilize the spectrum coefficients to reconstruct the echoes that were captured downhole.

Figure 14:
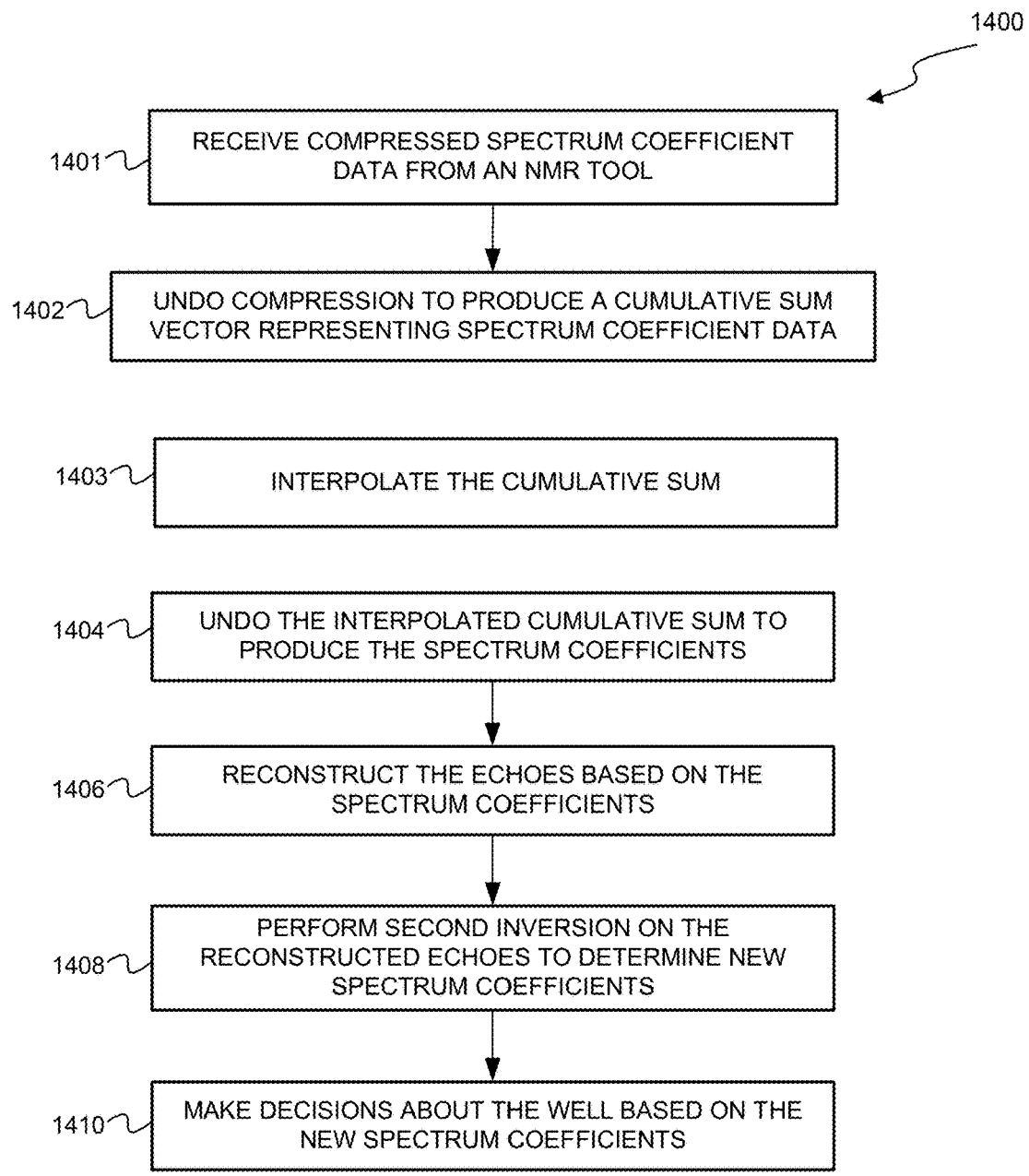
FIG. 14 is a flow diagram illustrating operations for a second phase of a split inversion process including a second inversion of NMR data.

FIG. 14 is a flow diagram illustrating operations for a second phase of a split inversion process including a second inversion of NMR data. The operations shown in FIG. 14 may be performed by a computing device at the surface. In FIG. 14, the flow 1400 begins at block 1401.

At block 1401, an NMR data system (e.g., surface computer system 66) may receive compressed spectrum coefficient data from an NMR logging tool (e.g., NMR tool 505). The NMR data system may receive the compressed spectrum coefficients over a relatively limited bandwidth transmission channel between the downhole NMR tool and the NMR data system at the surface. The flow continues at block 1402.

At block 1402, the NMR data system may decompress the compressed spectrum coefficient data to produce a cumulative sum vector representing spectrum coefficients that were produced downhole. The flow continues at block 1403.

At block 1403, the cumulative sum vector may be interpolated to determine more points. The additional points may represent additional cumulatively summed values. As noted above, each of the cumulatively summed values may represent a spectral coefficient. The flow continues at block 1404.

At block 1404, the NMR data system may reverse the cumulative sum process to produce the spectrum coefficients. The flow continues at block 1406.

At block 1406, the NMR data system reconstructs the echoes based on the spectrum coefficients.

At block 1408, the NMR data system may perform a second inversion on the reconstructed echoes to determine new spectrum coefficients. This second inversion may include a motion inclusive model/kernel/basis function to minimize the coefficient. Alternatively, a station (no motion) model/kernel/basis function may be used to minimize the coefficient. In some implementations, before the second inversion, the data may be corrected for a motion effect. Alternatively, a station (no motion) inversion may be used, while the end results are corrected for a motional effect on the data.

At block 1410, the NMR system may garner insights and/or make decisions about the well based on the new spectrum coefficients.

Figure 15:
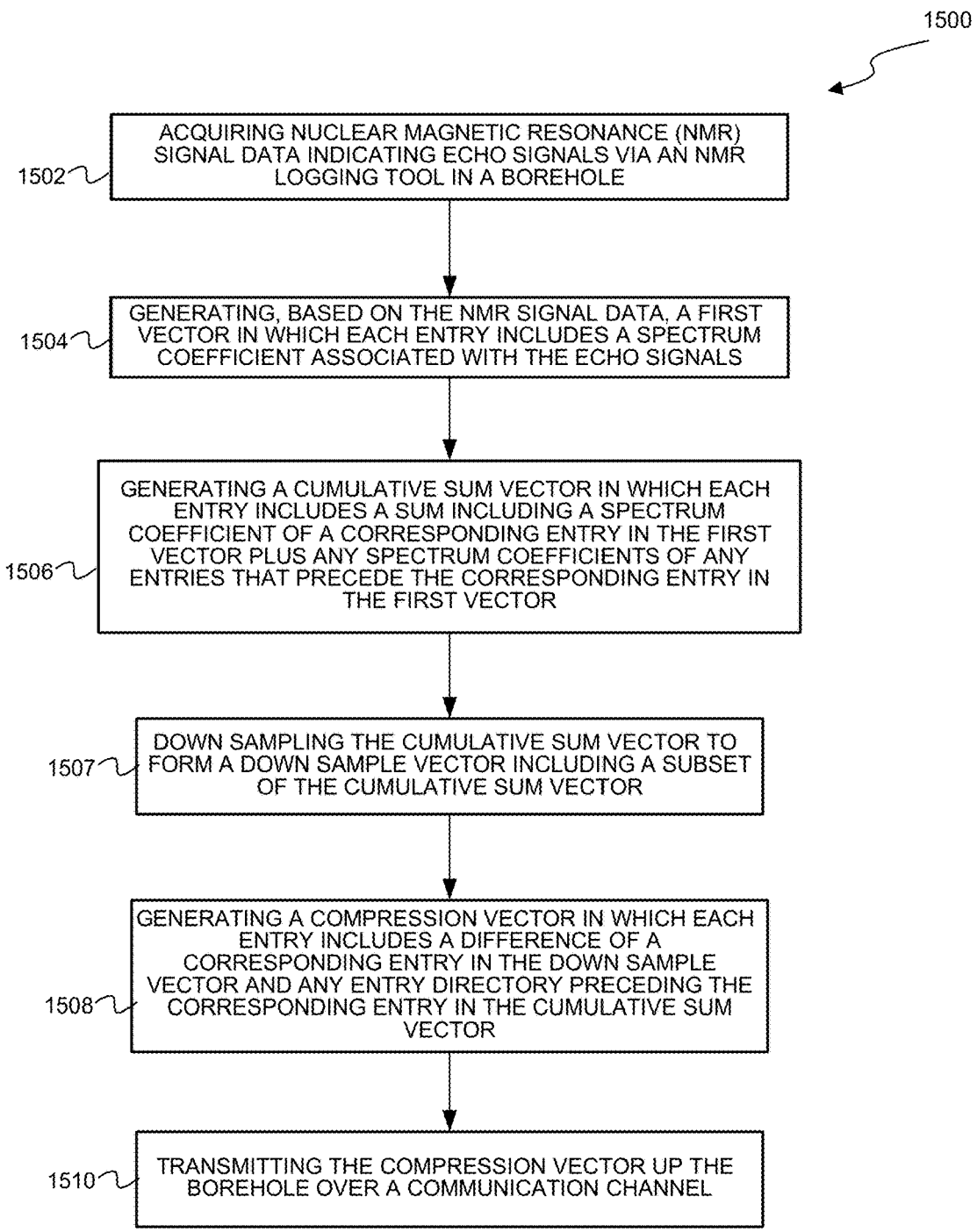
FIG. 15 is a flow diagram illustrating a method according to some embodiments of the inventive subject matter.

FIG. 15 is a flow diagram illustrating a method according to some embodiments of the inventive subject matter. In FIG. 15, the flow 1500 begins at block 1502. At block 1502, the method may include acquiring NMR signal data indicating echo signals via an NMR logging tool in a borehole. At block 1504, the method may include generating, based on the NMR signal data, a first vector in which each entry includes a spectrum coefficient associated with the echo signals. At block 1506, the method may include generating a cumulative sum vector in which each entry includes a some including a spectrum coefficient of a first corresponding entry in the first vector plus any spectrum coefficients of any entries that preclude the first corresponding entry in the first vector. At 1507, the method may include down sampling the cumulative sum vector to form a down sample vector including a subset of the cumulative sum vector. At block 1508, the method may include generating a compression vector in which each entry includes a difference of a second corresponding entry and the cumulative sum vector and any entry preceding the second corresponding entry in the cumulative sum vector. At block 1510, the method may include transmitting the compression vector of the borehole over a communication channel.

General Comments

FIGS. 1-15 and the operations described herein are examples meant to aid in understanding example implementations and should not be used to limit the potential implementations or limit the scope of the claims. Some implementations may perform additional operations, fewer operations, operations in parallel or in a different order, and some operations differently.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described throughout. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described herein. A general-purpose processor may be a microprocessor or any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, e.g., one or more modules of computer program instructions stored on a computer storage media for execution by, or to control the operation of, a computing device.

If implemented in software, the functions may be stored on or transmitted over as one or more instructions or code on a computer-readable medium. The processes of a method or algorithm disclosed herein may be implemented in a processor-executable instructions which may reside on a computer-readable medium. Computer-readable media includes both computer storage media and communication media including any medium that can be enabled to transfer a computer program from one place to another. Storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-Ray™ disc where disks usually reproduce data magnetically, while discs reproduce data optically with lasers. Combinations also can be included within the scope of computer-readable media. Additionally, the operations of a method or algorithm may reside as one or any combination or set of codes and instructions on a machine-readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein but are to be accorded the widest scope consistent with this disclosure, the principles and the novel features disclosed herein.

Additionally, a person having ordinary skill in the art will readily appreciate, the terms "upper" and "lower" are sometimes used for ease of describing the Figures and indicate relative positions corresponding to the orientation of the Figure on a properly oriented page and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example process in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described should not be understood as requiring such separation in all implementations, and the described program components and systems can generally be integrated together in a single software product or packaged into multiple software products. Additionally, other implementations are within the scope of the following claims. In some cases, the actions recited in the claims can be performed in a different order and still achieve desirable results.

EXAMPLE IMPLEMENTATIONS

Clause 1: A method comprising: acquiring nuclear magnetic resonance (NMR) signal data indicating echo signals via an NMR logging tool in a borehole: generating, based on the NMR signal data, a first vector in which each entry includes a spectrum coefficient associated with the echo signals: generating a cumulative sum vector in which each entry includes a sum including a spectrum coefficient of a corresponding entry in the first vector plus any spectrum coefficients of any entries that precede the first corresponding entry in the first vector: down sampling the cumulative sum vector to form a down-sampled vector including a subset of the cumulative sum vector: generating a compressed vector in which each entry includes a difference of a corresponding entry in the down sampled vector and any entry directly preceding the corresponding entry in the down sampled vector: and transmitting the compressed vector up the borehole over a communication channel.

Clause 2: The method of clause 1, wherein the compressed vector is represented in fewer binary digits than the first list.

Clause 3: The method of any one or more of clauses 1-2, further comprising: reconstructing the first vector of spectrum coefficients based on the compressed vector.

Clause 3: The method of any one or more of clauses 1-3, further comprising: determining one or more reconstructed echo signals based on the reconstructed first vector of spectrum coefficients.

Clause 4: The method of any one or more of clauses 1-3 further comprising: determining new spectrum coefficients based on the reconstructed echo signals: and selecting one or more operations in the borehole based on the new spectral coefficients.

Clause 5: The method of any one or more of clauses 1-4, further comprising: reconstructing the cumulative sum vector after transmission of the compressed vector up the borehole, wherein reconstructing the cumulative sum vector includes interpolating the down-sampled vector to form a reconstructed cumulative sum vector: and generating a reconstructed cumulative sum vector in which each entry of the reconstructed cumulative sum vector includes a value equal to a corresponding entry in the compressed vector plus any entry immediately preceding the corresponding entry in the compressed vector.

Clause 6: The method of any one or more of clauses 1-5, further comprising reconstructing the first vector based on the cumulative sum vector, where reconstructing the first vector includes generating a reconstructed first vector in which each entry of the reconstructed first vector includes a value equal to a corresponding entry in the cumulative sum vector minus any entry in the cumulative sum vector directly preceding the corresponding entry in the cumulative sum vector.

Clause 7: At least one computer-readable medium including instructions executable via a computing device, comprising: instructions to acquire nuclear magnetic resonance (NMR) signal data indicating echo signals via an NMR logging tool in a borehole: instructions to generating, based on the NMR signal data, a first vector in which each entry includes a spectrum coefficient associated with the echo signals: instructions to generate a cumulative sum vector in which each entry includes a sum including a spectrum coefficient of a corresponding entry in the first vector plus any spectrum coefficients of any entries that precede the first corresponding entry in the first vector: instructions to down sample the cumulative sum vector to form a down sample vector including a subset of the cumulative sum vector: instructions to generate a compressed vector in which each entry includes a difference of a corresponding entry in the down sample vector and any directly entry preceding the corresponding entry in the down sampled vector: and instructions to transmit the compressed vector up the borehole over a communication channel.

Clause 8: The computer-readable medium of clause 7, wherein the compressed vector is represented in fewer binary digits than the first vector.

Clause 9: The computer-readable medium of any one or more of clauses 7-8, further comprising: instructions to reconstruct the first vector of spectrum coefficients based on the compressed vector.

Clause 10: The computer-readable medium of any one or more of clauses 7-9, further comprising: instructions to determine one or more reconstructed echo signals based on the reconstructed first vector of spectrum coefficients.

Clause 11: The computer-readable medium of any one or more of clauses 7-10, further comprising: instructions to determine new spectrum coefficients based on the reconstructed echo signals: and instructions to select one or more operations in the borehole based on the new spectral coefficients.

Clause 12: The computer-readable medium of any one or more of clauses 7-11, further comprising: instructions to reconstruct the cumulative sum vector after transmission of the compressed vector up the borehole, wherein the instructions to reconstruct the cumulative sum vector include instructions to interpolate the down sampled vector to form a reconstructed cumulative sum vector: and instructions to generate a reconstructed cumulative sum vector in which each entry of the reconstructed cumulative sum vector includes a value equal to a corresponding entry in the compressed vector plus any entry immediately preceding the corresponding entry in the compressed vector.

Clause 13: The computer-readable medium of any one or more of clauses 7-12, further comprising instructions to reconstruct the first vector based on the cumulative sum vector, where the instructions to reconstruct the first vector include instructions to generate a reconstructed first vector in which each entry of the reconstructed first vector includes a value equal to a corresponding entry in the cumulative sum vector minus any entry in the cumulative sum vector directly preceding the corresponding entry in the cumulative sum vector.

Clause 14: A system comprising: a processor: at least one computer-readable medium including instructions executable by the processor, the instructions including instructions to acquire nuclear magnetic resonance (NMR) signal data indicating echo signals via an NMR logging tool in a borehole: instructions to generating, based on the NMR signal data, a first vector in which each entry includes a spectrum coefficient associated with the echo signals: instructions to generate a cumulative sum vector in which each entry includes a sum including a spectrum coefficient of a corresponding entry in the first vector plus any spectrum coefficients of any entries that precede the first corresponding entry in the first vector: instructions to down sample the cumulative sum vector to form a down sample vector including a subset of the cumulative sum vector: instructions to generate a compression vector in which each entry includes a difference of a corresponding entry in the down sampled vector and any entry directly preceding the corresponding entry in the down sample vector: and instructions to transmit the compressed vector up the borehole over a communication channel.

Clause 15: The system of clause 14, wherein the compressed vector is represented in fewer binary digits than the first vector.

Clause 16: The system of any one or more of clauses 14-15, further comprising: instructions to reconstruct the first vector of spectrum coefficients based on the compressed vector.

Clause 17: The system of any one or more of clauses 14-16, further comprising: instructions to determine one or more reconstructed echo signals based on the reconstructed first vector of spectrum coefficients.

Clause 18: The system of any one or more of clauses 14-17, further comprising: instructions to determine new spectrum coefficients based on the reconstructed echo signals; and instructions to select one or more operations in the borehole based on the new spectral coefficients.

Clause 19: The system of any one or more of clauses 14-18, further comprising: instructions to reconstruct the cumulative sum vector after transmission of the compressed vector up the borehole, wherein the instructions to reconstruct the cumulative sum vector include instructions to interpolate the down sampled vector to form a reconstructed cumulative sum vector; and instructions to generate a reconstructed cumulative sum vector in which each entry of the reconstructed cumulative sum vector includes a value equal to a corresponding entry in the compressed vector plus any entry immediately preceding the corresponding entry in the compressed vector.

Clause 20: The system of any one or more of clauses 14-19, further comprising: instructions to reconstruct the cumulative sum vector after transmission of the compressed vector up the borehole, wherein the instructions to reconstruct the cumulative sum vector include instructions to interpolate the down sampled vector to form a reconstructed cumulative sum vector; and instructions to generate a reconstructed cumulative sum vector in which each entry of the reconstructed cumulative sum vector includes a value equal to a corresponding entry in the compressed vector plus any entry immediately preceding the corresponding entry in the compressed vector.

What is claimed is:

1. A method comprising:
   acquiring nuclear magnetic resonance (NMR) signal data indicating echo signals via an NMR logging tool in a borehole;
   generating, based on the NMR signal data, a first vector in which each entry includes a spectrum coefficient associated with the echo signals;
   generating a cumulative sum vector in which each entry includes a sum including a spectrum coefficient of a corresponding entry in the first vector plus any spectrum coefficients of any entries that precede the corresponding entry in the first vector;
   down sampling the cumulative sum vector to form a down-sampled vector including a subset of the cumulative sum vector;
   generating a compressed vector in which each entry includes a difference of a corresponding entry in the down sampled vector and any entry directly preceding the corresponding entry in the down sampled vector; and
   transmitting the compressed vector up the borehole over a communication channel.

2. The method of claim 1, wherein the compressed vector is represented in fewer binary digits than the first vector.

3. The method of claim 1 further comprising:
   reconstructing the first vector of spectrum coefficients based on the compressed vector.

4. The method of claim 3 further comprising:
   determining one or more reconstructed echo signals based on the reconstructed first vector of spectrum coefficients.

5. The method of claim 4 further comprising:
   determining new spectrum coefficients based on the reconstructed echo signals; and
   selecting one or more operations in the borehole based on the new spectral coefficients.

6. The method of claim 1 further comprising,
   reconstructing the cumulative sum vector after transmission of the compressed vector up the borehole, wherein reconstructing the cumulative sum vector includes interpolating the down-sampled vector to form a reconstructed cumulative sum vector; and
   generating a reconstructed cumulative sum vector in which each entry of the reconstructed cumulative sum vector includes a value equal to a corresponding entry in the compressed vector plus any entry immediately preceding the corresponding entry in the compressed vector.

7. The method of claim 6 further comprising:
   reconstructing the first vector based on the cumulative sum vector, where reconstructing the first vector includes
   generating a reconstructed first vector in which each entry of the reconstructed first vector includes a value equal to a corresponding entry in the cumulative sum vector minus any entry in the cumulative sum vector directly preceding the corresponding entry in the cumulative sum vector.

8. At least one non-transitory computer-readable medium including instructions executable via a computing device, comprising:
   instructions to acquire nuclear magnetic resonance (NMR) signal data indicating echo signals via an NMR logging tool in a borehole;
   instructions to generating, based on the NMR signal data, a first vector in which each entry includes a spectrum coefficient associated with the echo signals;
   instructions to generate a cumulative sum vector in which each entry includes a sum including a spectrum coefficient of a corresponding entry in the first vector plus any spectrum coefficients of any entries that precede the corresponding entry in the first vector;
   instructions to down sample the cumulative sum vector to form a down sample vector including a subset of the cumulative sum vector;
   instructions to generate a compressed vector in which each entry includes a difference of a corresponding entry in the down sample vector and any directly entry preceding the corresponding entry in the down sampled vector; and
   instructions to transmit the compressed vector up the borehole over a communication channel.

9. The computer-readable medium of claim 8, wherein the compressed vector is represented in fewer binary digits than the first vector.

10. The computer-readable medium of claim 8 further comprising:
    instructions to reconstruct the first vector of spectrum coefficients based on the compressed vector.

11. The computer-readable medium of claim 10 further comprising:
    instructions to determine one or more reconstructed echo signals based on the reconstructed first vector of spectrum coefficients.

12. The computer-readable medium of claim 11 further comprising:
    instructions to determine new spectrum coefficients based on the reconstructed echo signals; and
    instructions to select one or more operations in the borehole based on the new spectral coefficients.

13. The computer-readable medium of claim 8 further comprising, instructions to reconstruct the cumulative sum vector after transmission of the
    compressed vector up the borehole, wherein the instructions to reconstruct the
    cumulative sum vector include
    instructions to interpolate the down sampled vector to form a reconstructed cumulative sum vector; and instructions to generate a reconstructed cumulative sum vector in which each entry of the reconstructed cumulative sum vector includes a value equal to a corresponding entry in the compressed vector plus any entry immediately preceding the corresponding entry in the compressed vector.

14. The computer-readable medium of claim 13 further comprising:
instructions to reconstruct the first vector based on the cumulative sum vector, where the instructions to reconstruct the first vector include
instructions to generate a reconstructed first vector in which each entry of the reconstructed first vector includes a value equal to a corresponding entry in the cumulative sum vector minus any entry in the cumulative sum vector directly preceding the corresponding entry in the cumulative sum vector.

15. A system comprising:
a processor;
at least one computer-readable medium including instructions executable by the processor, the instructions including
instructions to acquire nuclear magnetic resonance (NMR) signal data indicating echo signals via an NMR logging tool in a borehole;
instructions to generating, based on the NMR signal data, a first vector in which each entry includes a spectrum coefficient associated with the echo signals;
instructions to generate a cumulative sum vector in which each entry includes a sum including a spectrum coefficient of a corresponding entry in the first vector plus any spectrum coefficients of any entries that precede the first corresponding entry in the first vector;
instructions to down sample the cumulative sum vector to form a down sample vector including a subset of the cumulative sum vector;
instructions to generate a compression vector in which each entry includes a difference of a corresponding entry in the down sampled vector and any entry directly preceding the corresponding entry in the down sample vector; and
instructions to transmit the compressed vector up the borehole over a communication channel.

16. The system of claim 15, wherein the compressed vector is represented in fewer binary digits than the first vector.

17. The system of claim 15 further comprising:
instructions to reconstruct the first vector of spectrum coefficients based on the compressed vector.

18. The system of claim 17 further comprising:
instructions to determine one or more reconstructed echo signals based on the reconstructed first vector of spectrum coefficients.

19. The system of claim 18 further comprising:
instructions to determine new spectrum coefficients based on the reconstructed echo signals; and
instructions to select one or more operations in the borehole based on the new spectral coefficients.

20. The system of claim 15 further comprising,
instructions to reconstruct the cumulative sum vector after transmission of the
compressed vector up the borehole, wherein the instructions to reconstruct the cumulative sum vector include
instructions to interpolate the down sampled vector to form a reconstructed cumulative sum vector; and
instructions to generate a reconstructed cumulative sum vector in which each entry of the reconstructed cumulative sum vector includes a value equal to a corresponding entry in the compressed vector plus any entry immediately preceding the corresponding entry in the compressed vector.

* * * * *